(12) United States Patent
Holtzapple et al.

(10) Patent No.: US 7,663,283 B2
(45) Date of Patent: Feb. 16, 2010

(54) ELECTRIC MACHINE HAVING A HIGH-TORQUE SWITCHED RELUCTANCE MOTOR

(75) Inventors: Mark T. Holtzapple, College Station, TX (US); George A. Rabroker, College Station, TX (US); Babak Fahimi, Arlington, TX (US); Mehrdad Ehsani, College Station, TX (US)

(73) Assignees: The Texas A & M University System, College Station, TX (US); StarRoter Corporation, College Station, TX (US)

(*) Notice: Subject to any disclaimer, the term of this patent is extended or adjusted under 35 U.S.C. 154(b) by 245 days.

(21) Appl. No.: 11/379,174

(22) Filed: Apr. 18, 2006

(65) Prior Publication Data
US 2006/0279155 A1 Dec. 14, 2006

Related U.S. Application Data

(63) Continuation-in-part of application No. 11/369,202, filed on Mar. 6, 2006, which is a continuation of application No. 10/359,488, filed on Feb. 5, 2003, now Pat. No. 7,008,200.

(60) Provisional application No. 60/672,258, filed on Apr. 18, 2005.

(51) Int. Cl.
*H02K 17/42* (2006.01)
*H02K 19/20* (2006.01)
*H02K 19/24* (2006.01)

(52) U.S. Cl. ..................................... 310/168
(58) Field of Classification Search ................ 310/168, 310/164, 49 R, 254, 156, 268, 264, 258, 266, 310/51
See application file for complete search history.

(56) References Cited

U.S. PATENT DOCUMENTS

| | | | |
|---|---|---|---|
| 457,294 A | 8/1891 | Tilden |
| 724,665 A | 4/1903 | Cooley |
| 892,295 A | 6/1908 | Nutz |
| 1,501,051 A | 7/1924 | Hill |
| 1,854,692 A | 4/1932 | Cooper |

(Continued)

FOREIGN PATENT DOCUMENTS

AU 20406/29 12/1929

(Continued)

OTHER PUBLICATIONS

PCT Notification of Transmittal of The International Search Report and The Written Opinion of the International Searching Authority, or the Declaration, PCT/US05/37802, dated May 6, 2008.

(Continued)

*Primary Examiner*—Chandrika Prasad
(74) *Attorney, Agent, or Firm*—Baker Botts L.L.P.

(57) ABSTRACT

According to one embodiment of the present invention, an electric machine comprises a stator and a rotor. The stator has at least one stator pole with a first leg and a second leg. The rotor has at least one rotor pole. The rotor rotates relate to the stator. The at least one rotor is configured to rotate between the first leg and the second leg of the at least one stator pole.

49 Claims, 12 Drawing Sheets

U.S. PATENT DOCUMENTS

| | | | |
|---|---|---|---|
| 2,011,338 A | 8/1935 | Hill | |
| 2,138,490 A | 11/1938 | Haller | |
| 2,240,056 A | 4/1941 | Schmitz | |
| 2,291,354 A | 7/1942 | Sibley | |
| 2,373,368 A | 4/1945 | Witchger | |
| 2,459,447 A | 1/1949 | Milliken | |
| 2,601,397 A | 6/1952 | Hill et al. | |
| 2,938,663 A | 5/1960 | Lück | |
| 2,965,039 A | 12/1960 | Morita | |
| 2,974,482 A | 3/1961 | Kelley | |
| 3,037,348 A | 6/1962 | Gassmann | |
| 3,082,747 A | 3/1963 | Friedrich | |
| 3,126,755 A | 3/1964 | Friedrich | |
| 3,167,913 A | 2/1965 | Mühlberg et al. | |
| 3,214,087 A | 10/1965 | Lück | |
| 3,226,013 A | 12/1965 | Toyoda et al. | |
| 3,273,341 A | 9/1966 | Wildhaber | |
| 3,295,748 A | 1/1967 | Leitgeb | |
| 3,303,783 A | 2/1967 | Neubauer | |
| 3,303,784 A | 2/1967 | Neubauer | |
| 3,334,253 A | 8/1967 | Hill | |
| 3,459,337 A | 8/1969 | Williamson | |
| 3,536,426 A | 10/1970 | Albrecht et al. | |
| 3,623,317 A | 11/1971 | Foster-Pegg | |
| 3,657,879 A | 4/1972 | Ewbank et al. | |
| 3,844,117 A | 10/1974 | Ryan | |
| 3,846,987 A | 11/1974 | Baldwin | |
| 3,877,218 A | 4/1975 | Negben | |
| 3,894,255 A | 7/1975 | Newton, Jr. | |
| 3,928,974 A | 12/1975 | Benson | |
| 3,932,987 A | 1/1976 | Munzinger | |
| 3,972,652 A | 8/1976 | Minnicino | |
| 3,995,431 A | 12/1976 | Schwartzman | |
| 4,023,366 A | 5/1977 | Schneider | |
| 4,028,023 A | 6/1977 | Labus | |
| 4,044,558 A | 8/1977 | Benson | |
| 4,052,928 A | 10/1977 | Pierrat et al. | |
| 4,058,938 A | 11/1977 | Harle et al. | |
| 4,074,533 A | 2/1978 | Stockton | |
| 4,127,364 A | 11/1978 | Eiermann et al. | |
| 4,145,167 A | 3/1979 | Baatrup | |
| 4,179,890 A | 12/1979 | Hanson | |
| 4,199,305 A | 4/1980 | Pareja | |
| 4,336,686 A | 6/1982 | Porter | |
| 4,355,249 A * | 10/1982 | Kenwell | 310/49 R |
| 4,392,797 A | 7/1983 | Ruf | |
| 4,439,119 A | 3/1984 | Petersen et al. | |
| 4,457,677 A | 7/1984 | Todd | |
| 4,478,553 A | 10/1984 | Leibowitz et al. | |
| 4,491,171 A | 1/1985 | Zenkner | |
| 4,502,284 A | 3/1985 | Chrisoghilos | |
| 4,517,478 A * | 5/1985 | Oudet | 310/49 R |
| 4,519,206 A | 5/1985 | van Michaels | |
| 4,553,513 A | 11/1985 | Miles et al. | |
| 4,578,955 A | 4/1986 | Medina | |
| 4,630,447 A | 12/1986 | Webber | |
| 4,653,269 A | 3/1987 | Johnson | |
| 4,657,009 A | 4/1987 | Zen | |
| 4,674,960 A | 6/1987 | Rando et al. | |
| 4,696,158 A | 9/1987 | DeFrancisco | |
| 4,759,178 A | 7/1988 | Joy | |
| 4,775,299 A | 10/1988 | Overfield et al. | |
| 4,801,255 A | 1/1989 | Wankel | |
| 4,836,760 A | 6/1989 | MacLeod | |
| 4,940,394 A | 7/1990 | Gibbons | |
| 4,951,790 A | 8/1990 | Blything | |
| 4,958,997 A | 9/1990 | Harwath | |
| 4,976,595 A | 12/1990 | Taniguchi | |
| 4,986,739 A | 1/1991 | Child | |
| 5,044,907 A | 9/1991 | Hirosawa et al. | |
| 5,074,110 A | 12/1991 | Singh | |
| 5,101,782 A | 4/1992 | Yang | |
| 5,195,882 A | 3/1993 | Freeman | |
| 5,199,971 A | 4/1993 | Akechi | |
| 5,271,215 A | 12/1993 | Guillet | |
| 5,284,016 A | 2/1994 | Stark | |
| 5,289,072 A | 2/1994 | Lange | |
| 5,311,739 A | 5/1994 | Clark | |
| 5,345,131 A * | 9/1994 | Torok | 310/181 |
| 5,472,329 A | 12/1995 | Maynard et al. | |
| 5,522,356 A | 6/1996 | Palmer | |
| 5,538,073 A | 7/1996 | Stopa | |
| 5,554,020 A | 9/1996 | Rao et al. | |
| 5,557,921 A | 9/1996 | Frutschi et al. | |
| 5,617,719 A | 4/1997 | Ginter | |
| 5,618,171 A | 4/1997 | von Behr et al. | |
| 5,622,044 A | 4/1997 | Bronicki et al. | |
| 5,634,339 A | 6/1997 | Lewis et al. | |
| 5,682,738 A | 11/1997 | Barber | |
| 5,733,111 A | 3/1998 | Yu et al. | |
| 5,755,196 A | 5/1998 | Klassen | |
| 5,761,898 A | 6/1998 | Barnes et al. | |
| 5,769,619 A | 6/1998 | Crvelin | |
| 5,798,591 A | 8/1998 | Lillington et al. | |
| 5,836,192 A | 11/1998 | Getman et al. | |
| 5,839,270 A | 11/1998 | Jirnov et al. | |
| 5,854,526 A | 12/1998 | Sakamoto | |
| 5,964,087 A | 10/1999 | Tort-Oropeza | |
| 6,085,829 A | 7/2000 | Neuhaus et al. | |
| 6,174,151 B1 | 1/2001 | Yarr | |
| 6,313,544 B1 | 11/2001 | Mongia et al. | |
| 6,336,317 B1 | 1/2002 | Holtzapple et al. | |
| 6,487,862 B1 | 12/2002 | Doorley | |
| 6,720,686 B1 * | 4/2004 | Horst | 310/51 |
| 7,008,200 B2 | 3/2006 | Holtzapple et al. | |
| 7,186,101 B2 | 3/2007 | Holtzapple et al. | |
| 2003/0011268 A1 | 1/2003 | Even et al. | |

FOREIGN PATENT DOCUMENTS

| | | |
|---|---|---|
| DE | 35 13348 | 10/1986 |
| DE | 3812637 | 7/1989 |
| DE | 4023299 | 2/1991 |
| DE | 197 20 048 A1 | 11/1998 |
| EP | 02207187 | 8/1990 |
| EP | 1 197 634 | 4/2002 |
| FR | 2720788 | 8/1995 |
| FR | 9748884 | 12/1997 |
| FR | 2 812 041 A1 | 7/2000 |
| GB | 2 085 969 | 5/1982 |
| GB | 2221258 | 1/1990 |
| JP | 02-207187 | 8/1990 |
| JP | 405079464 | 3/1993 |
| JP | 405001674 | 8/1993 |
| JP | 06330875 | 11/1994 |
| WO | WO 03/067030 A2 | 2/2003 |

OTHER PUBLICATIONS

PCT Notification of Transmittal of The International Search Report and The Written Opinion of the International Searching Authority, or the Declaration, dated Aug. 16, 2007.
PCT Written Opinion for International Application No. PCT/US03/03549; filed Feb. 5, 2003.
PCT International Search Report dated May 28, 2003 for PCT/US03/03549 filed Feb. 5, 2003.
Declaration of Mark Holtzapple, dated May 10, 2005, 6 pages.
Declaration of Mark Holtzapple, dated Apr. 29, 2005, 6 pages.

* cited by examiner

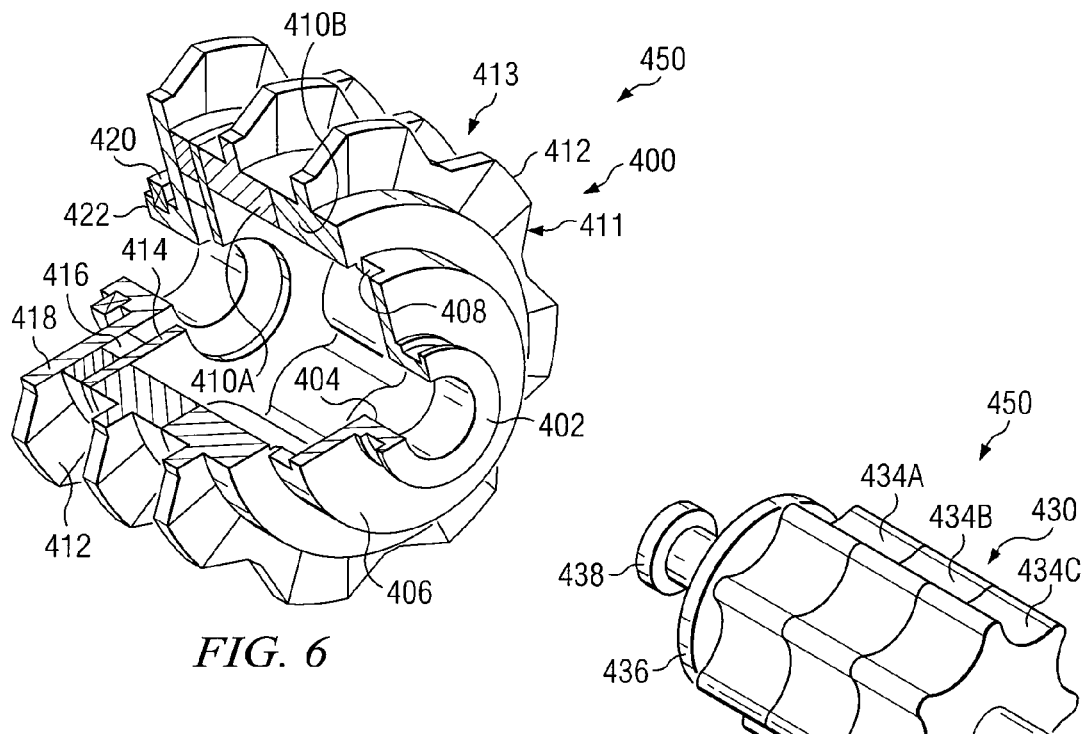

ELECTRIC MACHINE HAVING A HIGH-TORQUE SWITCHED RELUCTANCE MOTOR

RELATED APPLICATIONS

This application claims priority to U.S. Provisional Application No. 60/672,258, filed on Apr. 18, 2005, and is a Continuation-in-Part of U.S. patent application Ser. No. 11/369,202 filed on Mar. 6, 2006, which is a continuation of U.S. application Ser. No. 10/359,488, filed on Feb. 5, 2003 now U.S. Pat. No. 7,008,200. U.S. patent application Ser. No. 11/369,202, is incorporated by reference herein.

TECHNICAL FIELD OF THE INVENTION

This invention relates in general to electric machines and, more particularly, to a high-torque switched reluctance motor.

BACKGROUND OF THE INVENTION

Switched reluctance motors (SRM) generally include components constructed from magnetic materials such as iron, nickel, or cobalt. A pair of opposing coils in the SRM may become electronically energized. The inner magnetic material is attracted to the energized coil causing an inner assembly to rotate while producing torque. Once alignment is achieved, the pair of opposing coils is de-energized and a next pair of opposing coils is energized.

SUMMARY OF THE INVENTION

According to one embodiment of the present invention, an electric machine comprises a stator and a rotor. The stator has at least one stator pole with a first leg and a second leg. The rotor has at least one rotor pole. The rotor rotates relative to the stator. The at least one rotor is configured to rotate between the first leg and the second leg of the at least one stator pole.

Certain embodiments of the invention may provide numerous technical advantages. For example, a technical advantage of one embodiment may include the capability to increase the symmetry of poles in an electrical machine to increase torque. Other technical advantages of other embodiments may include the capability to allow very small gaps in an electrical machine to be maintained, even when components deform due to thermal and centrifugal effects. Other technical advantages of other embodiments may include the capability to allow external coils to be separated from the interior of an electrical machine, which may be chemically corrosive if it is integrated with compressors, expanders, or pumps. Yet other technical advantages of other embodiments may include the capability to utilize U-shaped poles that are electrically and magnetically isolated from adjacent poles, thereby allowing them to be built in modules for insertion into a non-magnetic frame, which may have ease of manufacture and repair. Yet other technical advantages of other embodiments may include the capability to utilize U-shaped poles that are external to the motor enclosure, enabling better thermal contact with the ambient environment and reducing the tendency to overheat. Still yet other technical advantages of other embodiments may include the capability to create a magnetic flux in a rotor of an electrical machine that does not cross the axis of the rotor. Still yet other technical advantages of other embodiments may include the capability to allow the space within the interior of a rotor of an electrical machine to be available for items such as, but not limited to compressors, expanders, engines, and pumps. Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the embodiments of the invention and features and advantages thereof, reference is made to the following description, taken in conjunction with the accompanying figures, wherein like reference numerals represent like parts, in which:

FIG. 6 shows an outer rotor assembly of a rotor/stator configuration, according to an embodiment of the invention;

FIG. 7 shows an inner rotor assembly of a rotor/stator configuration, according to an embodiment of the invention;

FIG. 8 shows a stator/compressor case of a rotor/stator configuration, according to an embodiment of the invention;

DETAILED DESCRIPTION OF EXAMPLE EMBODIMENTS

Figure 1A:
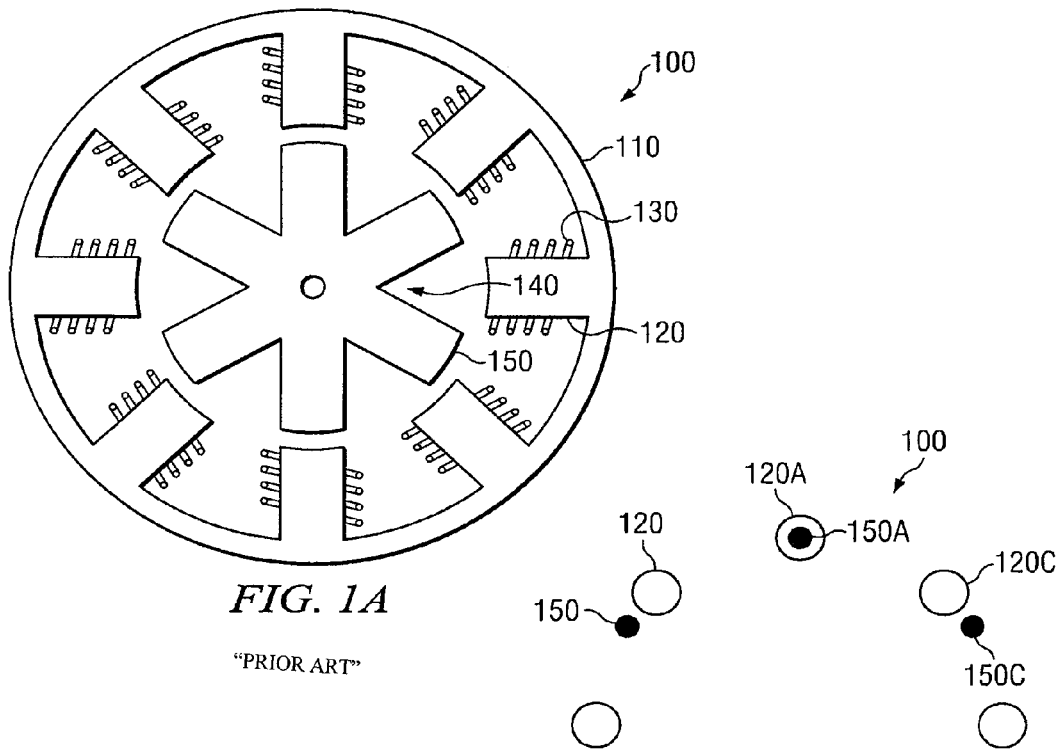
FIG. 1A shows a schematic representation of a conventional switched reluctance motor (SRM)

It should be understood at the outset that although example implementations of embodiments of the invention are illustrated below, embodiments of the present invention may be implemented using any number of techniques, whether currently known or in existence. The present invention should in no way be limited to the example implementations, drawings, and techniques illustrated below. Additionally, the drawings are not necessarily drawn to scale.

Various electric machines such as motors and generators and type variations associated with such motors and generators may avail benefits from the embodiments described herein. Example type variations include, but are not limited to, switched reluctance motors (SRM), permanent magnet AC motors, brushless DC (BLDC) motors, switched reluctance generators (SRG), permanent magnet AC generators, and brushless dc generators (BLDCG). Although particular embodiments are described with reference to one or more type variations of motor and/or generators, it should be expressly understood that such embodiments may be utilized with other type variations of motors or generators. Accordingly, the description provided with certain embodiments described herein are intended only as illustrating examples type variations that may avail benefits of embodiments of the invention. For example, teachings of some embodiment of the invention increase the torque, power, and efficiency of electric motors, particularly switched reluctance motors (SRM). Such embodiments may also be used with permanent magnet AC motors and brushless DC (BLDC) motors. Some of same advantages described with reference to these embodiments may be realized by switched reluctance generators (SRG), permanent magnet AC generators, and brushless dc generators (BLDCG).

In conventional radial and axial SRMs, the magnetic flux flows through a long path through the whole body of a stator and rotor. Due to the saturation of iron, conventional SRMs have a large drop in the magneto motive force (MMF) because the flux path is so large. One way to reduce the loss of MMF is to design thicker stators and rotors, which reduces the flux density. However, this approach increases the weight, cost, and size of the machine. Accordingly, teachings of embodiment of the invention recognize that a more desirable approach to reduce these losses is to minimize the flux path, which is a function of geometry and type of machine.

Teachings of some embodiments additionally introduce a new family of stator/pole interactions. In this family, stator poles have been changed from a conventional cylindrical shape to U-shaped pole pairs. This configuration allows for a shorter magnetic flux path, which in particular embodiments may improve the efficiency, torque, and power density of the machine.

To take full advantage of the isolated rotor/stator structures of this invention, sensorless SRM and BLDC control methods may be utilized, according to particular embodiments.

The switched reluctance motor (SRM) has salient poles both on both the stator and rotor. It has concentrated windings on the stator and no winding on the rotor. This structure is inexpensive and rugged, which helps SRMs to operate with high efficiency over a wide speed range. Further, its converter is fault tolerant. SRMs can operate very well in harsh environments, so they can be integrated with mechanical machines (e.g., compressors, expanders, engines, and pumps). However, due to the switching nature of their operation, SRMs need power switches and controllers. The recent availability of inexpensive power semiconductors and digital controllers has allowed SRMs to become a serious competitor to conventional electric drives.

There are several SRM configurations depending on the number and size of the rotor and stator poles. Also, as with conventional electric machines, SRMs can be built as linear-, rotary-, and axial-flux machines. In these configurations, the flux flows 180 electrical degrees through the iron. Due to saturation of iron, this long path can produce a large drop in MMF, which decreases torque density, power, and efficiency of the machines. Increasing the size of the stator and rotor back iron can avoid this MMF drop, but unfortunately, it increases the motor size, weight, and cost. Using bipolar excitation of phases can shorten the flux path, but they need a complex converter. Also, they are not applicable when there is no overlapping in conduction of phases.

FIG. 1A shows a schematic representation of a conventional switched reluctance motor (SRM) 100. The SRM 100 of FIG. 1A includes a stator 110 and a rotor 140. The stator 110 includes eight stationary stator poles 120 (each with its own inductor coil 130) and the inner rotor 140 includes six rotating rotor poles 150 (no coils). The components of the SRM 100 are typically constructed from magnetic materials such as iron, nickel, or cobalt. In particular configurations, the materials of the SRM 100 can be laminated to reduce the effect of eddy currents. At any one time, a pair of opposing coils 130 is energized electrically. The inner magnetic material in the rotor poles 150 of the rotor 140 are attracted to the energized coil 130 causing the entire inner rotor 140 to rotate while producing torque. Once alignment is achieved, the pair of opposing coils 130 is de-energized and the next pair of opposing coils 130 is energized. This sequential firing of coils 130 causes the rotor 140 to rotate while producing torque. An illustration is provided with reference to FIG. 1B.

Figure 1B:
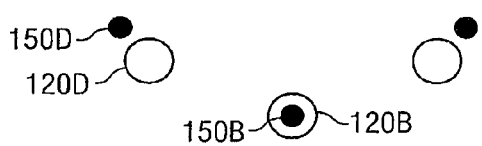
FIG. 1B is a dot representation of the SRM of FIG. 1A.

FIG. 1B is a dot representation of the SRM 100 of FIG. 1A. The white circles represent the stator poles 120 and the black circles represent the rotor poles 150. Stator poles 120A, 120B are currently aligned with rotor poles 150A, 150B. Accordingly, the coils associated with this alignment (coils associated with stator poles 120A, 120B) can be de-energized and another set of coils can be fired. For example, if the coils associated with the stator poles 120C and 120D are fired, rotor poles 150C, 150D will be attracted, rotating the rotor 140 counter-clockwise. The SRM 100 of FIG. 1 has inherent two-fold symmetry.

Figure 2:
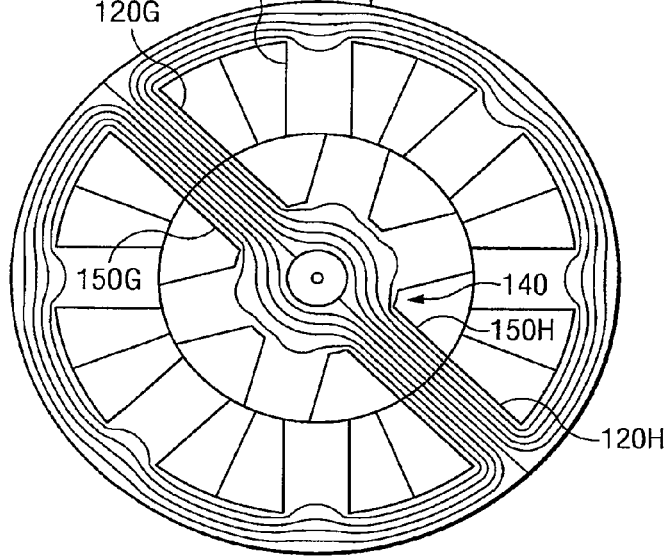
FIG. 2 shows a schematic representation of a long flux path through the conventional switched reluctance motor (SRM) of FIG. 1A.

FIG. 2 shows a schematic representation of a long flux path through the conventional switched reluctance motor (SRM) 100 of FIG. 1A. In the SRM 100, magnetic fluxes must traverse 180 degree through both the stator 110 and the rotor 140—for example, through stator pole 120G, rotor pole 150G, rotor pole 150H, stator pole 120H, and inner rotor 140, itself. Such long flux paths can lead to the creation of undesirably eddies, which dissipate energy as heat. Additionally, due to the high flux density, the magneto motive force (MMF) drop will be very high, particularly if the stator 110 and rotor 140 back iron are thin.

Figure 3:
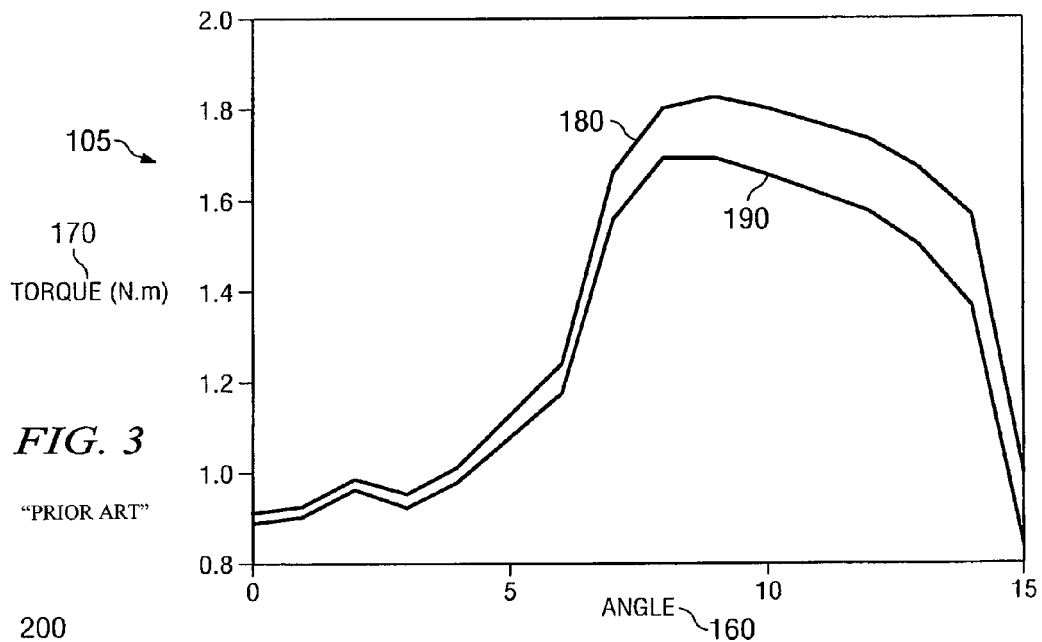
FIG. 3 shows in a chart the effect of MMF drop in the torque production of a one-phase, one horsepower machine.
Figure 4A:
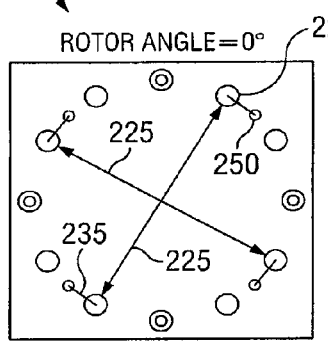
FIG. 4 shows a dot representation for a switched reluctance motor (SRM), according to an embodiment of the invention.
Figure 4B:
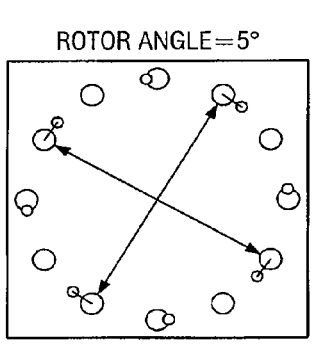
Figure 4C:
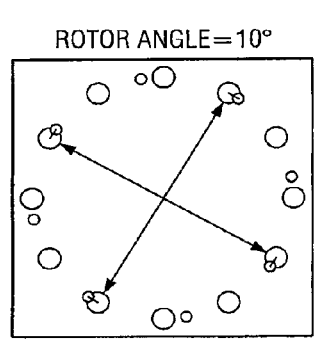
Figure 4D:
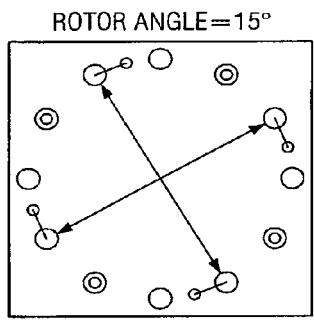
Figure 4E:
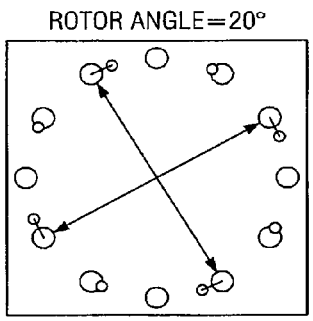
Figure 4F:
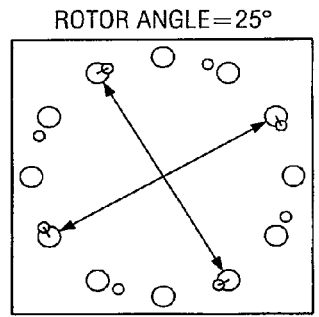
Figure 4G:
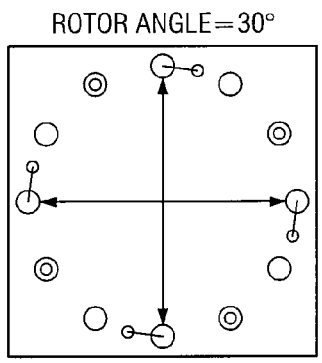
Figure 4H:
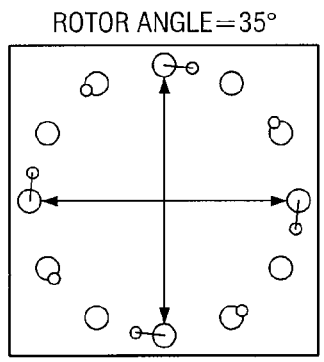
Figure 4I:
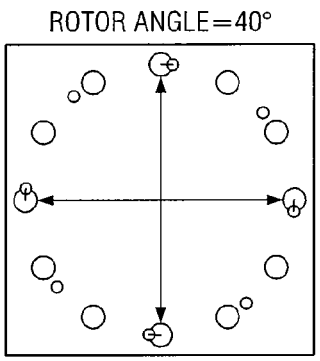

As an example of MMF drop, FIG. 3 shows in a chart 105 the effect of MMF drop in the torque production of a one-phase, one horsepower machine. In FIG. 3, output torque 170 is plotted against rotor angle 160. Line 180 show torque without the effect of saturation in the rotor 140 and stator 110 back iron and line 190 shows torque with the effect of saturation in rotor 140 and stator 110 back iron. As can be seen, the MMF drop in torque production can be more than 6%.

Accordingly, teachings of some embodiments reduce the length of the flux path. Further details of such embodiments will be described in greater detail below.

FIG. 4 shows a dot representation for a switched reluctance motor (SRM) 200, according to an embodiment of the invention. The SRM 200 of FIG. 4 may operate in a similar manner to the SRM described with reference to FIG. 1B. However, whereas the SRM 100 of FIG. 1B fire two coils associated with two stator pole 120 at a time, the SRM of FIG. 4 fires four coils associated with four stator poles 220 at a time. The increased firing of such coils/stator poles 220 increases the torque.

The SRM 200 of FIG. 4 has a rotor with eight rotor poles 250 and a stator with twelve stator poles 220. The active magnetized sets of stator poles 220 are denoted by arrowed lines 225 and the attractive forces through the flux linkages (e.g., between a rotor pole 250 and stator pole 220) are shown by the shorter lines 235 through a counterclockwise progression of 40° of rotor rotation. At 45°, the configuration would appear identical to the 0° configuration. As can be seen with reference to these various rotor angles, as soon as a alignment between four stator poles 220 and four rotor poles 250 occur, four different stator poles 220 are fired to attract the rotor poles 250 to the four different stator poles 220.

The switched reluctance motor 200 in FIG. 4 has four-fold symmetry. That is, at any one time, four stator poles 220 (the sets denoted by arrowed lines 225) are energized, which as referenced above, is twice as many as a conventional switched reluctance motor (e.g., SRM 100 of FIG. 1). Because twice as many stator poles 220 are energized, the torque is doubled.

In particular embodiments, adding more symmetry will further increase torque. For example, six-fold symmetry would increase the torque by three times compared to a conventional switched reluctance motor. In particular embodiments, increased symmetry may be achieved by making the rotor as blade-like projections that rotate within a U-shaped stator, for example, as described below with reference to the embodiments of FIGS. 5A and 5B. In other embodiments, increased symmetry may be achieved in other manners as described in more details below.

Figure 5A:
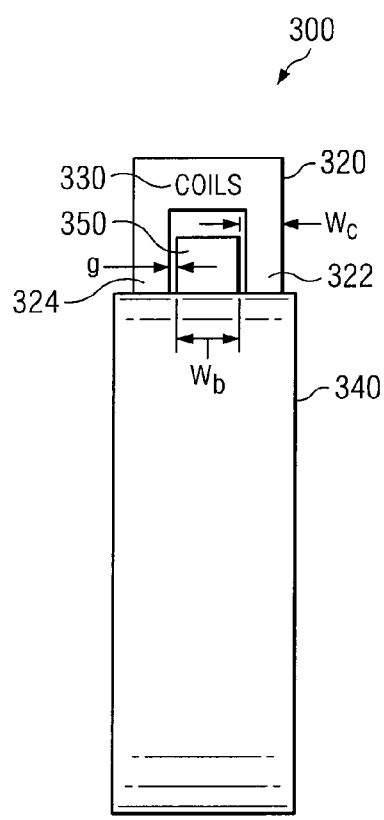
FIGS. 5A and 5B illustrate a rotor/stator configuration, according to an embodiment of the invention.
Figure 5B:
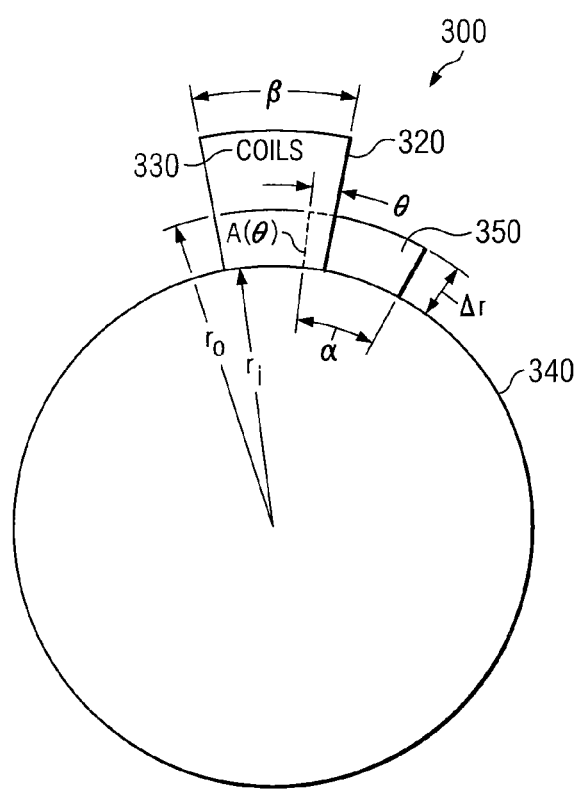

FIGS. 5A and 5B illustrate a rotor/stator configuration 300, according to an embodiment of the invention. For purposes of illustration, the embodiment of the rotor/stator configuration 300 of FIGS. 5A and 5B will be described as a switched reluctance motor (SRM). However, as briefly referenced above, in particular embodiments, the rotor/stator configuration 300 may be utilized as other types of motors. And, in other embodiments, the rotor/stator configuration 300 may be utilized in other types of electric machines such as generators.

In the rotor/state configuration 300 of FIGS. 5A and 5B, a blade-like rotor pole or blade 350, affixed to a rotating body 340, is shown passing through a U-shaped electromagnet core or U-shaped stator pole 320. In this configuration, the flux path is relatively short, compared to conventional SRMs. For example, the magnetic flux produced by a coil 330 fired on the U-shaped pole 320 would pass through one leg 322 of the U-shaped stator pole 320 through the blade 350 and to the other leg 324 of the U-shaped stator pole 320 in a circular-like path. In particular embodiments, this short path—in addition to diminishing the long path deficiencies described above— enables increased symmetry because the path does not traverse the center of the rotating body 340 and has little effect, if any, on other flux paths. Additionally, in particular embodiments, the short path enables use of the center of the rotating body 340 for other purposes. Further details of such embodiments will be described below. Furthermore, radial loads are applied to the rotor with this embodiment and axial loads on the rotor are balanced. Additionally, extra radius is afforded by the blade 350, thus increasing generated torque.

The following is a first order analysis of the electromagnetic interaction between a single blade 350/pole 320 set, according to an embodiment of the invention. The schematic of FIGS. 5A and 5B is a blade 350/pole 320 set where $r_i$ defines the outer boundary of the outer compressor rotor 340, $r_o$, is the radius at the blade tips, $\Delta r$ is the radial length of the blade 350, $\alpha$ is the angular dimension of the blade 350, $\beta$ is the angular dimension of the coil 330, $\theta$ is the angular engagement of the rotor blade 350 within the coil 330, $A(\theta)$ is the area available for flux linkage, g is the gap dimension on each side of the blade 350, $W_b$ is the width of the blade 350, and $w_c$ is the width of the core.

The magnetic flux through the magnetic circuit created is:

$$\phi = \frac{Ni}{R_c + R_g} \qquad \text{Eq. 1A}$$

where N is the number of turns in the coil 330, i is the current through the coil 330, and $R_c$ and $R_g$ are the reluctances of the core and the air gap, respectively. The reluctances are $$R_c = \frac{l_c}{\mu A_c} \qquad \text{Eq. 2A}$$

$$R_g = \frac{2g}{\mu_o A_g}$$

where $l_c$ is the flux length of the core material, $\mu$ is the permeability of the core material, $A_c$ is the cross sectional area of the core, g is the air gap thickness, $\mu_o$ is the permeability of free space (in the air gap), and $A_g$ is the area of the gap over which flux linkage occurs. Two gaps, one on either side of the blade 350, have been accounted for in the reluctance expression. The magnetic reluctance, R, is analogous to electrical resistance. Because the permeability of the core material is far greater than that of air, the reluctance of the air gap dominates in Eq. 1A, so substituting the expression for $R_g$ into Eq. 1A gives $$\phi \approx \frac{Ni\mu_o A_g}{2g} \qquad \text{Eq. 3A}$$

Because the air gap has been assumed to dominate the total reluctance, the inductance, L, can be expressed as $$L = \frac{\lambda}{i} = \frac{N\phi}{i} = \frac{N^2 \mu_o A_g}{2g} \qquad \text{Eq. 4A}$$

where $\lambda = N\phi$ is the flux linkage.

The stored energy in the field is given by $$W_{fld} = \frac{1}{2}\frac{\lambda^2}{L}. \qquad \text{Eq. 5A}$$

An expression for $L(\theta)$ is required in Eq. 5A. Under present assumptions, the only reason for the inductance to vary with rotor angle is that the flux linkage area over the air gap, $A_g$, changes with rotation. From FIGS. 5A and 5B, the following relationship between $\theta$ and $A_g$ can be written as $$A_g(r^*\theta) = 2\Delta r(r^*\theta) \quad \text{Eq. 6A}$$

because the air gap dimensions change by sweeping the radial span $\Delta r = r_o - r_i$ over the arc length $r^*\theta$, where $r^* = \frac{1}{2}(r_o + r_i)$. Thus $$L(r*\theta) = \frac{N^2 \mu_o \Delta r(r*\theta)}{g}, \quad \text{Eq. 7A}$$

and Eq. 5A will be modified to $$W_{fld} = \frac{1}{2} \frac{\lambda^2}{L(r*\theta)}. \quad \text{Eq. 8A}$$

Substituting Eq. 7A into Eq. 8A gives $$W_{fld} = \frac{1}{2} \frac{\lambda^2 g}{N^2 \mu_o \Delta r(r*\theta)} = \frac{\lambda^2 g}{2N^2 \mu_o \Delta r(r*\theta)}. \quad \text{Eq. 9A}$$

From conservation of energy, $dW_{fld}$ can be expressed as $$dW_{fld}(\lambda, r^*\theta) = i\, d\lambda - f_{fld}\, d(r^*\theta) \quad \text{Eq. 10A}$$

The total derivative of $dW_{fld}$ with respect to the independent variables $\lambda$ and $r^*\theta$ is $$dW_{fld} = (\lambda, r*\theta) = \frac{\partial W_{fld}}{\partial \lambda} d\lambda + \frac{\partial W_{fld}}{\partial (r*\theta)} d(r*\theta). \quad \text{Eq. 11A}$$

Observation of Eq. 10A and 11A indicates that $$f_{fld} = -\frac{\partial W_{fld}}{\partial (r*\theta)} \quad \text{Eq. 12A}$$
$$= -\frac{\partial}{\partial (r*\theta)}\left[\frac{\lambda^2 g}{2N^2 \mu_o \Delta r(r*\theta)}\right]$$
$$= \frac{\lambda^2 g}{2N^2 \mu_o \Delta r(r*\theta)^2}.$$

Substituting $\lambda = L(r^*\theta)i$ from Eq. 4A into Eq. 12A, the following dependence of $f_{fld}$ on coil current, i, is obtained:

$$f_{fld} = \frac{N^2 \mu_o \Delta r}{2g} i^2. \quad \text{Eq. 13A}$$

Ultimately, the torque produced from $f_{fld}$ acting at a radius $r^*$ is needed for an individual blade 350/pole 320 set. This resulting torque is $$T_{fld} = \frac{N^2 \mu_o \Delta r}{2g} r^* i^2. \quad \text{Eq. 14A}$$

SRM Torque Generation

The key result of the above analysis is the following equation for the torque generated by a single blade 350/pole 320 set interaction as depicted in FIGS. 5A and 5B:

$$T_{fld} = \frac{N^2 \mu_o \Delta r}{2g} r^* i^2 \quad (1)$$

In Eq. 1, $T_{fld}$ is the torque generated by the magnetic field, N is the total number of winding encirclements around the stator pole core, $\mu_o$ is the permeability of free space, $\Delta r = r_o - r_i$ (radial dimension of the rotor blade), $r^* = r_i + \Delta r/2$ (radius to the blade center), i is the coil current, and g is the air gap dimension.

In particular embodiments, a rotor/stator configuration (e.g., the rotor/stator configuration 300 of FIGS. 5A and 5B) can be integrated with other features such as a gerotor compressor and other embodiments described in the following United States Patents and Patent Application Publications, the entirety of which are hereby incorporated by reference: Publication No. 2003/0228237; Publication No. 2003/0215345; Publication No. 2003/0106301; U.S. Pat. Nos. 6,336,317; and 6,530,211.

The following assumptions may be made with the application of Eq. 1 to design an integral compressor/SRM:

1) laminated Sofcomag (2.3 Tesla saturation limit) is used to carry magnetic flux
2) magnetic flux is limited to 2.0 Tesla, below saturation
3) four poles are magnetized at any given time
4) fringe effects in the laminates are ignored As an example, an industrial compressor requires roughly 2.6 MW. Operating at 3,600 rpm, the torque required is 6,896 N-m. Appropriate selection and sizing of the rotor to process the specified capacity yields $r_i = 14$ in (0.3556 m). A reasonable gap dimension given thermal expansion and bearing play is $g = 0.080$ in (0.00203 m). With assumption 2, the maximum ampere-turn product may be calculated such that a 2 Tesla flux density is not exceeded. Also from the above analysis, $$Ni = \frac{2gB}{\mu_o}. \quad (2)$$

The maximum product of Ni can be calculated as 6,468 A. Because $r^* = r_i + \Delta r/2$, $\Delta r$ is selected along with the number of blade/pole arrays stacked in the axial direction to satisfy the torque requirement. Recalling that four blade/pole sets are active at a given instant in time and letting m be the number of stacked arrays, the total torque is $$T_{tot} = 4 T_{fld} m \quad (3)$$

For $\Delta r = 4.5$ in (0.127 m), $r^* = 16.5$ in (0.4191 m). Letting m=3, $T_{tot}$ can be calculated as 7,323 N-m. The resulting power output at 3,600 rpm is 2.76 MW.

Design Case Implementation

FIGS. 6-10 illustrate a rotor/stator configuration 450, according to an embodiment of the invention. The rotor/stator configuration 450 of FIGS. 6-10 is used with a compressor. However, as briefly referenced above, in particular embodiments, the rotor/stator configuration 450 may be utilized as other types of motors and other types of electric machines such as generators. The rotor/stator configuration 450 of FIGS. 6-10 includes three stacked arrays of twelve stator poles 444 and eight rotor blades 412. The rotor/stator configuration 450 for the compressor in FIGS. 6-10 may operate in a similar manner to the rotor/stator configuration 300 described above with reference to FIGS. 5A and 5B. FIG. 6 shows an outer rotor assembly 400 of the rotor/stator configuration 450, according to an embodiment of the invention. The outer rotor assembly 400 in FIG. 6 includes a bearing cap 402, a bearing sleeve 404, a port plate 406, inlet/outlet ports 408, two rotor segments 410A/410B with rotor blades 412 mounted, a seal plate 414 to separate the dry compression region from the lubricated gear cavity, a representation of the outer gear 416 (internal gear), an end plate 418 with blades 412 mounted, an outer rear bearing 420, and another bearing cap 422. In this embodiment, the outer compressor rotor serves as the rotor for the SRM.

In this embodiment, there are eight outer rotor lobes 411 with eight blades 412 in each radial array 413 of rotor poles. In particular embodiments, such symmetry may be necessary to minimize centrifugal stress/deformation. In this configuration, ferromagnetic materials utilized for the operation of the rotor/stator configuration 450 may only be placed in the blades 412 of the radial array 413.

FIG. 7 shows an inner rotor assembly 430 of the rotor/stator configuration 450, according to an embodiment of the invention. The inner rotor assembly 430 of FIG. 7 includes an inner shaft 432, a stack of three (seven lobed) inner rotors 434A/434B/434C, a spur gear 436, and an inner rear bearing 438.

Details of operation of the inner rotor assembly 430 with respect to the outer rotor assembly 400, according to certain embodiments of the invention, as well as with other configuration variations are described in further detail in one ore more of the following United States Patents and/or Patent Application Publications, which as referenced above are incorporated by reference: Publication No. 2003/0228237; Publication No. 2003/0215345; Publication No. 2003/0106301; U.S. Pat. Nos. 6,336,317; and 6,530,211.

FIG. 8 shows a stator/compressor case 440 of the rotor/stator configuration 450, according to an embodiment of the invention. The stator/compressor case 440 of FIG. 8 in this embodiment includes three stacks 442A, 442B, 442C of twelve stator poles 444, spaced at equal angles. Although the stator poles 444 could be mounted to the case 440 in many ways, an external coil embodiment is shown in FIG. 8. There are two coils 446A, 446B per stator pole 444, which are mounted in sets of three into a nonferromagnetic base plate 448, forming a bolt-in pole cartridge 450. In particular embodiments, the coils 446A, 446B may be copper coils. In other embodiments, the coils 446A, 446B may be made of other materials. In particular embodiments, the number of coils 446 on a given stator pole 444 can be increased above two, thereby reducing the voltage that must be supplied to each coil. During operation of particular embodiments, all poles in four cartridges 450 (90° apart) may be magnetized simultaneously. The magnetization occurs sequentially causing the outer rotor assembly 400 of FIG. 6 to rotate.

Figure 9:
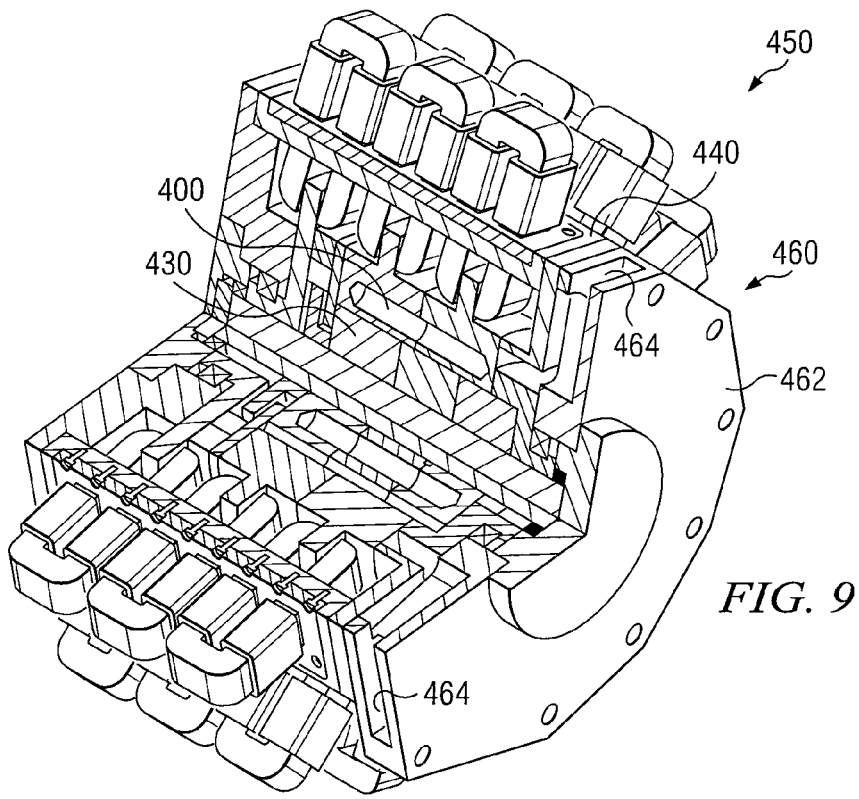
FIG. 9 shows a cutaway view of a composite assembly of a rotor/stator configuration, according to an embodiment of the invention.
Figure 10:
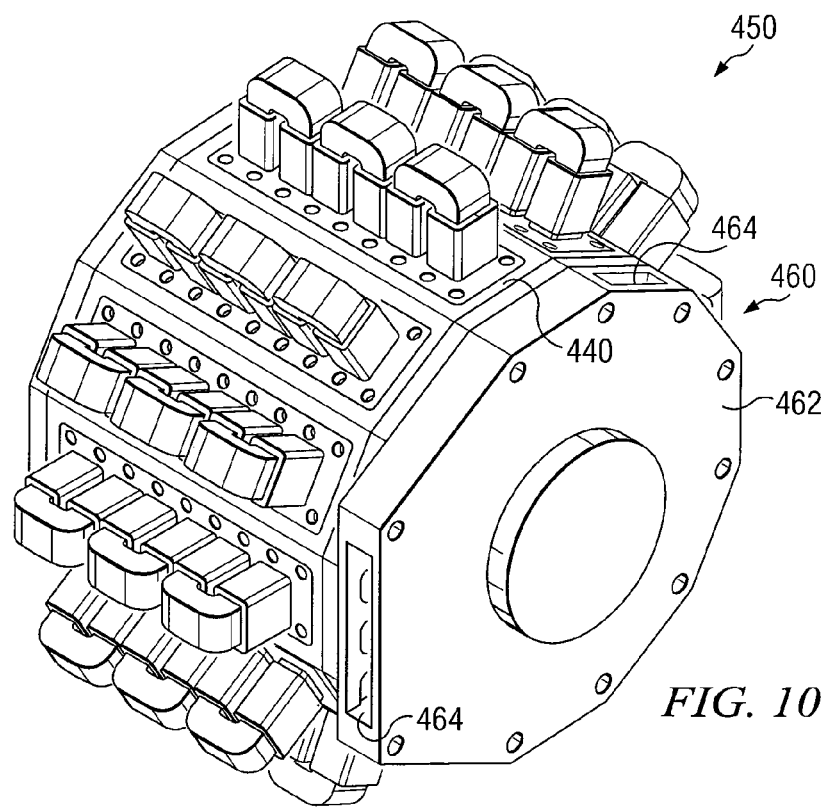
FIG. 10 shows the composite assembly of FIG. 9 without the cutaway.

FIG. 9 shows a cutaway view of a composite assembly 460 of a rotor/stator configuration 450, according to an embodiment of the invention. The composite assembly 460 shows an integration of the outer assembly 400, the inner assembly 430, and the stator/compressor case 440 of FIGS. 6-8 as well as end plates 462 providing bearing support and gas inlet/outlet porting through openings 464. FIG. 10 shows the composite assembly 460 without the cutaway.

In certain embodiments, during operation, the rotor may expand due to centrifugal and thermal effects. To prevent contact between the rotor poles and stator poles, a large air gap is typically used. Equation 1 above described with reference to FIGS. 5A and 5B shows that the torque is strongly affected by the air gap. A smaller gap results in more torque. Accordingly, there are advantages to reducing the gap as small as possible. Teachings of some embodiments recognize configurations for maintaining small gap during thermal and centrifugal expansion of a rotor.

Figure 11:
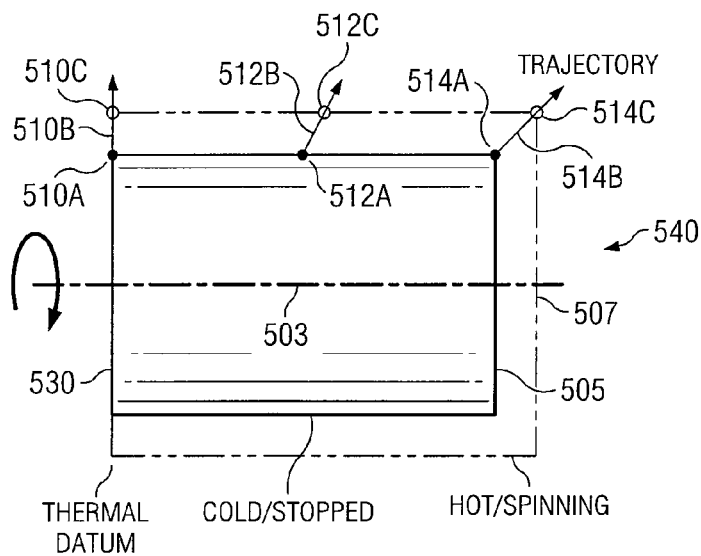
FIG. 11 shows a side view of how a rotor changes shape when it expands due to centrifugal and thermal effects.

FIG. 11 shows a side view of how a rotor 540 changes shape when it expands due to centrifugal and thermal effects. The rotor 540 has an axis of rotation 503. The solid line 505 represents the rotor 540 prior to expansion and the dotted line 507 represents the rotor 540 after expansion. Dots 510A, 512A, and 514A represent points on the rotor 540 at the cold/stopped position and dots 510C, 512C, and 514C represent the same points on the rotor 540 at the hot/spinning position. The left edge or thermal datum 530 does not change because it is held in place whereas the right edge is free to expand. The trajectories 510B, 512B, and 514B of dots is purely radial at the thermal datum 530 and becomes more axial at distances farther from the thermal datum 530.

Figure 12:
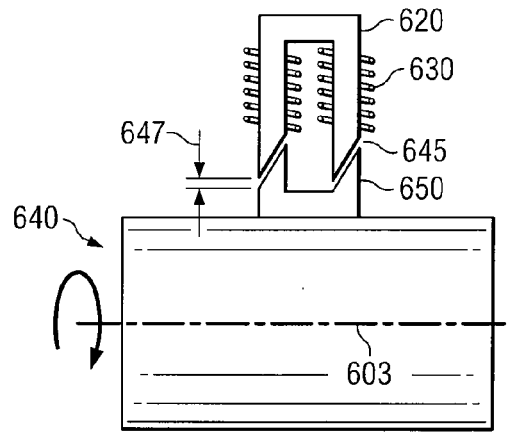
FIG. 12 shows a rotor/stator configuration, according to another embodiment of the invention.

FIG. 12 shows a rotor/stator configuration 600, according to an embodiment of the invention. The rotor/stator configuration 600 includes a rotor 640 that rotates about an axis 603. The rotor 640 includes rotor poles 650 that interact with stator poles 620, for example, upon firing of coils 630. The rotor/stator configuration 600 of FIG. 12 may operate in a similar manner to the rotor/stator configuration 300 of FIGS. 5A and 5B, except for an interface 645 between the rotor pole 650 and the stator pole 620. In the rotor/stator configuration 600 of FIG. 12, an angle of interface 645 between the rotor pole 650 and stator pole 620 is the same as the trajectory of a dot on the surface of the rotor 540 shown in FIG. 11. By matching these angles, the surface of the rotor pole 650 and the surface of the stator pole 620 slide past each other without changing an air gap 647, even as the rotor 640 spins and heats up. This design allows for very small air gaps to be maintained even at a wide variety of rotor temperatures. In particular embodiments, the housing that holds the stator pole 620 may be assumed to be maintained at a constant temperature. Various different angles of interface 645 may be provided in a single configuration for a rotor pole 650/stator pole 620 pair, dependant upon the trajectory of the dot on the surface of the rotor 640.

Figures 13A, 13B:
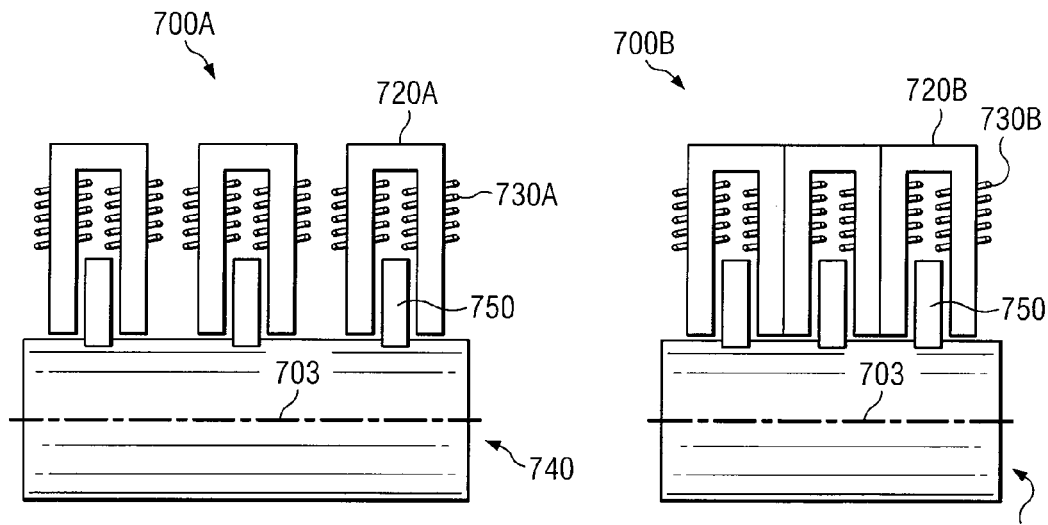
FIGS. 13A and 13B show a rotor/stator configuration, according to another embodiment of the invention.

FIGS. 13A and 13B show a rotor/stator configuration 700A, 700B, according to another embodiment of the invention. The rotor/stator configurations 700A, 700B include rotors 740 that rotate about an axis 703. The rotor/stator configurations 700A, 700B of FIGS. 13A and 13B may operate in a similar manner to the rotor/stator configuration 300 of FIGS. 5A and 5B, including rotor poles 750, stator poles 720A, 720B, and coils 730A, 730B. The rotor/stator configuration 700A of FIG. 13A show three U-shaped stators 720A, operating as independent units. The rotor/stator configuration 700B of and FIG. 13B shows a single E-shaped stators 710B operating like three integrated U-shaped stators 720A. This E-shaped stator 720B allows for higher torque density.

Although an E-shaped stator 720B is shown in FIG. 13B, other shapes may be used in other embodiments in integrating stator poles into a single unit.

Figure 14:
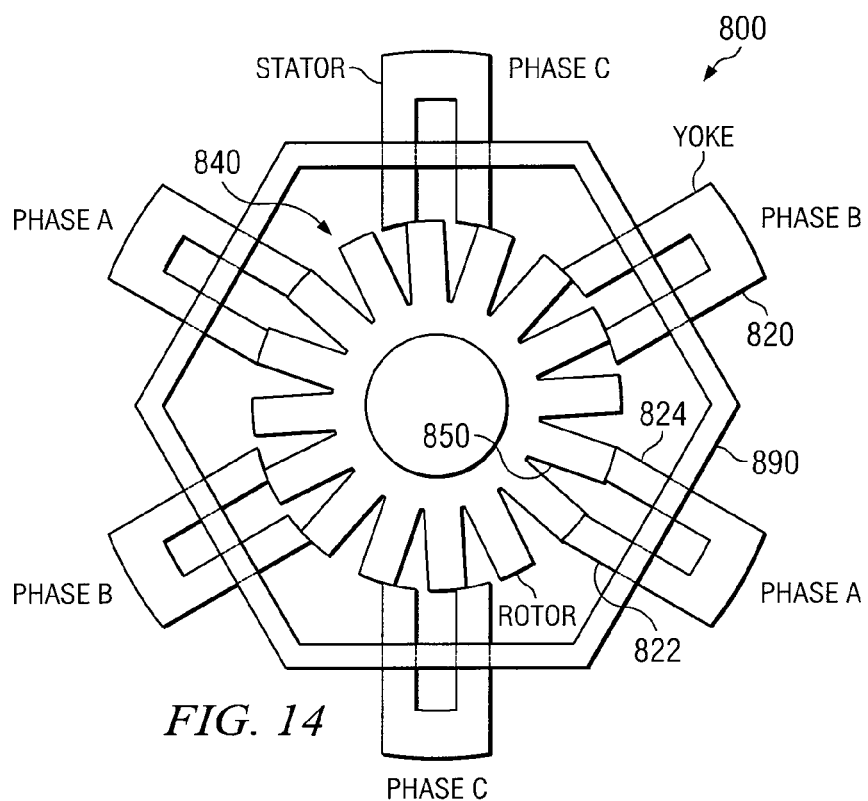
FIG. 14 shows a rotor/stator configuration, according to another embodiment of the invention.

FIG. 14 shows a rotor/stator configuration 800, according to another embodiment of the invention. In a similar manner to that described above with other embodiments, the rotor/stator configuration 800 of FIG. 14 may be utilized with various types of electric machines, including motors and generators. The rotor/stator configuration 800 of FIG. 14 may operate in a similar manner to the rotor/stator configuration 300 of FIGS. 5A and 5B, including rotor poles 850 and U-shaped stator poles 820. However, the stator poles 820 have been axially rotated ninety degrees such that the rotor poles 850 do not transverse between a gap of the U-shape stator poles 820. Similar to FIGS. 5A and 5B, the flux path is relatively short. For example, the magnetic flux produced by a coil fired on the U-shaped pole 820 would pass through one leg 822 of the pole 820 through the rotor pole 850 through a periphery of the rotor through another rotor pole 850 and to the other leg 824 of the pole 820 in a circular-like path.

The rotor/stator configuration 800 of FIG. 14 is shown with three phases A, B, and C and two pairs of stator poles 820 per each phase. In this embodiment, stator poles 820 are U-shaped iron cores with coils that are inserted into a non-ferromagnetic yoke 890. In other embodiments the stator poles 820 may be made of materials other than iron and may have other configurations. The stator poles 820 in particular embodiments may be electrically and magnetically isolated from each other. The rotor 840 in the embodiment of FIG. 14 may operate like a rotor of a conventional SRM; however, unlike a conventional SRM, the pitches of the rotor pole 850 and stator pole 820 are the same.

Figure 15A:
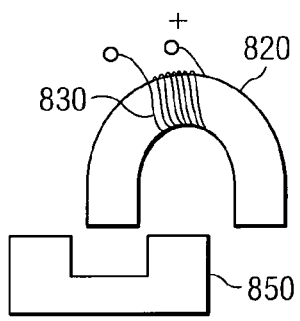
FIG. 15 shows an unaligned position, a midway position, and an aligned position.
Figure 15B:
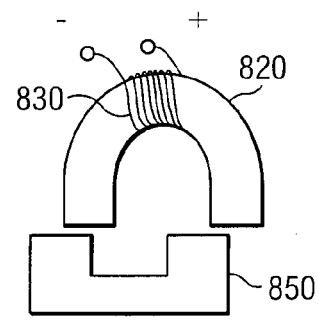
Figure 15C:
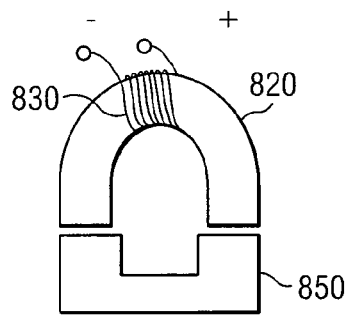

The magnetic reluctance of each phase changes with position of the rotor 840. As shown in FIG. 15, when a rotor pole 850 is not aligned with two stator poles 820, the phase inductance is at a minimum and this position may be called an unaligned position. When the rotor pole 850 is aligned with the stator pole 820, the magnetic inductance is at a maximum and this position may be called an aligned position. Intermediate between the aligned position and unaligned position is an intermediate position. SRM torque is developed by the tendency of the magnetic circuit to find the minimum reluctance (maximum inductance) configuration.

The configuration of FIG. 14 is such that whenever the rotor 840 is aligned with one phase, the other two phases are half-way aligned, so the rotor 840 can move in either direction depending which phase will be excited next.

For a phase coil with current i linking flux, the co-energy W' can be found from the definite integral:

$$W' = \int_0^i \lambda di \quad (4)$$

The torque produced by one phase coil at any rotor position is given by:

$$T = \left[\frac{\partial W'}{\partial \theta}\right]_{i=constant} \quad (5)$$

The output torque of an SRM is the summation of torque of all phases:

$$T_m = \sum_{j=1}^N T(i_j, \theta) \quad (6)$$

If the saturation effect is neglected, the instantaneous torque can be given as:

$$T = \frac{1}{2} i^2 \frac{dL}{d\theta} \quad (7)$$

Figure 16:
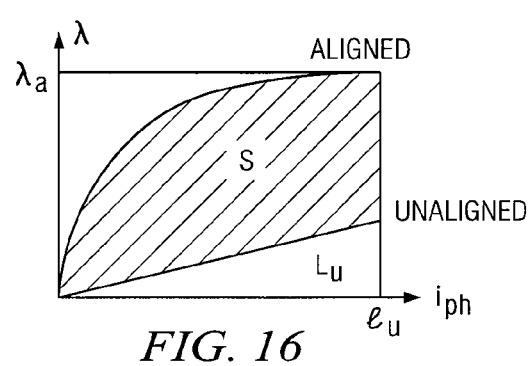
FIG. 16 shows an energy conversion loop.

From Equation 7, it can be seen that to produce positive torque (motoring torque) in SRM, the phase has to be excited when the phase bulk inductance increases, which is the time that the rotor moves towards the stator pole. Then it should be unexcited when it is in aligned position. This cycle can be shown as a loop in flux linkage ($\lambda$)—phase current ($i_{ph}$) plane, which is called energy conversion loop as shown in FIG. 16. The area inside the loop (S) is equal to the converted energy in one stroke. So the average power ($P_{ave}$) and the average torque of the machine ($T_{ave}$) can be calculated as follows:

$$P_{ave} = \frac{N_p N_r N_s S \omega}{4\pi} \quad (8)$$

$$T_{ave} = \frac{N_p N_r N_{ph} S}{4\pi} \quad (9)$$

where, $N_p$, $N_r$, $N_{ph}$, $\omega$ are the number of stator pole pairs per phase, number of rotor poles, number of stator phases, and rotor speed, respectively.

By changing the number of phases, stator pole pitch, and stator phase-to-phase distance angle, different types of short-flux-path SRMs can be designed.

Figure 17:
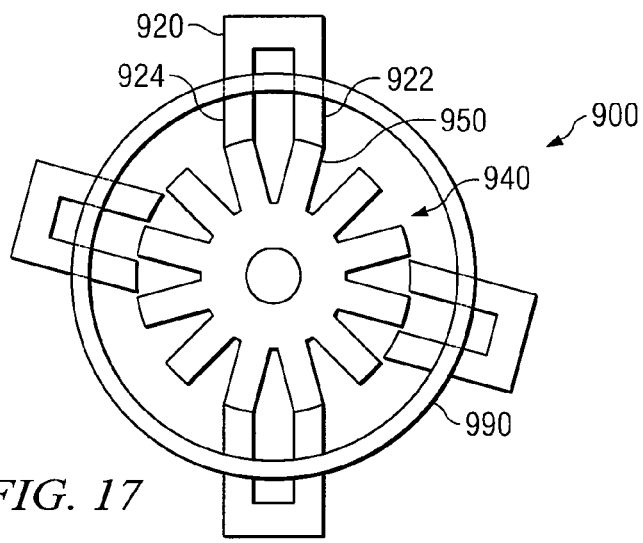
FIG. 17 shows a rotor/stator configuration, according to another embodiment of the invention.

FIG. 17 shows a rotor/stator configuration 900, according to another embodiment of the invention. The rotor/stator configuration 900 of FIG. 17 is a two-phase model, which operates in a similar manner to the model described with reference to FIG. 14. The configuration 900 of FIG. 17 includes rotor 940; rotor poles 950; stator poles 920; legs 922, 924; and yoke 990.

Figure 18:
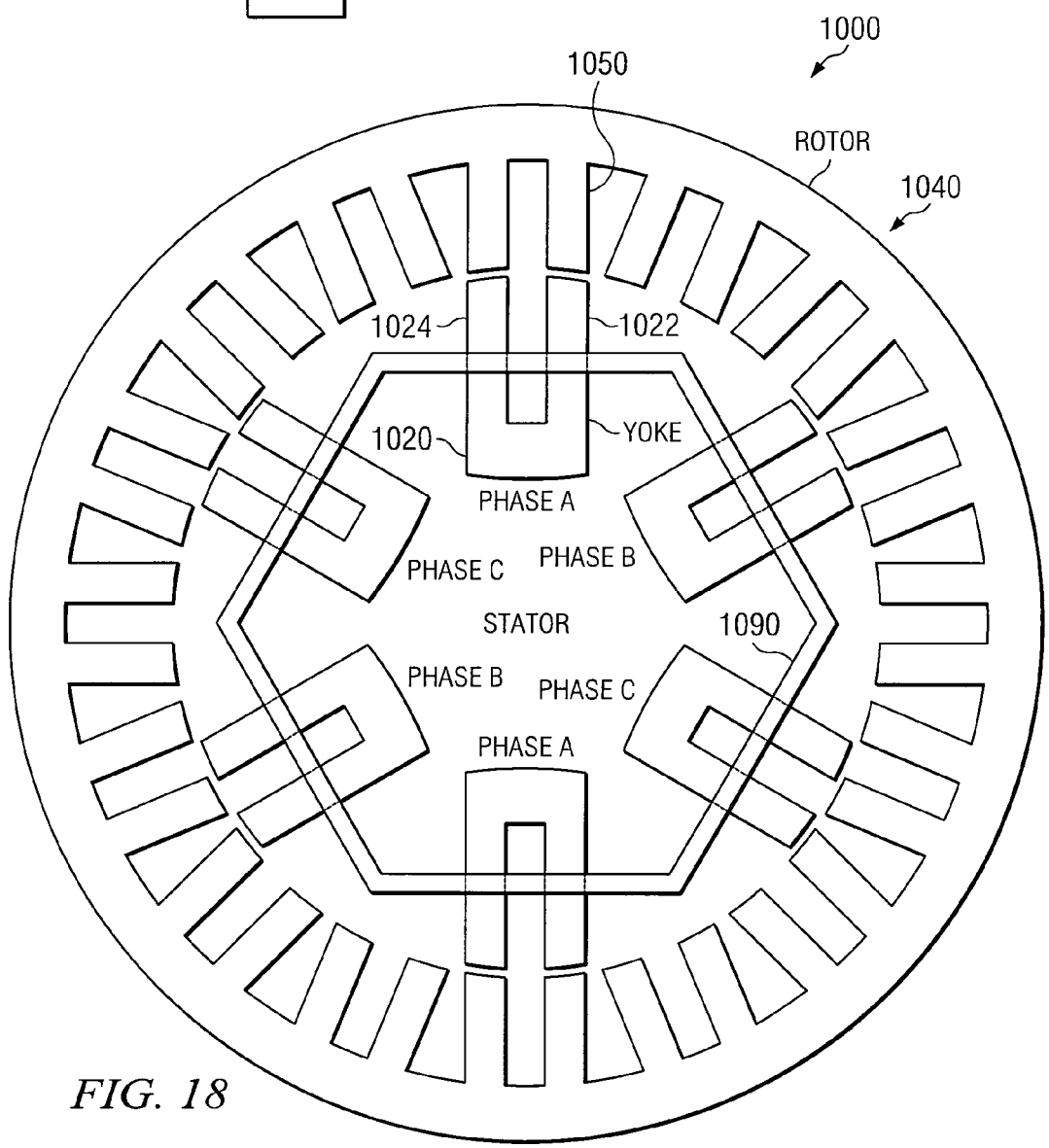
FIG. 18 shows a rotor/stator configuration, according to another embodiment of the invention.

FIG. 18 shows a rotor/stator configuration 1000, according to another embodiment of the invention. In a similar manner to that described above with other embodiments, the rotor/stator configuration 1000 of FIG. 18 may be utilized with various types of electric machines, including motors and generators. The rotor/stator configuration 1000 of FIG. 18 may operate in a similar manner to rotor/stator configuration 1000 of FIG. 14, including U-shaped stator poles 1020, rotor poles 1050, a non-ferromagnetic yoke 1080, and phases A, B, and C. However, in the rotor/stator configuration 1000 of FIG. 18, the rotor poles 1050 are placed radially outward from the stator poles 1020. Accordingly, the rotor 1040 rotates about the stator poles 1020. Similar to FIG. 14, the flux path is relatively short. For example, the magnetic flux produced by a coil fired on the U-shaped pole 1020 would pass through one leg 1022 of the stator pole 1020 through the rotor pole 1050 and to the other leg 1024 of the stator pole 820 in a circular-like path. As one example application of the rotor/stator configuration 1000 according to a particular embodiment, the rotor/stator configuration 1000 may be a motor in the hub of hybrid or electric (fuel cell) vehicles, and others. In this embodiment, the wheel is the associated with the rotor 1040, rotating about the stators 1020. This rotor/stator configuration 1000 may additionally be applied to permanent magnet motors, for example, as shown in FIG. 19.

Figure 19:
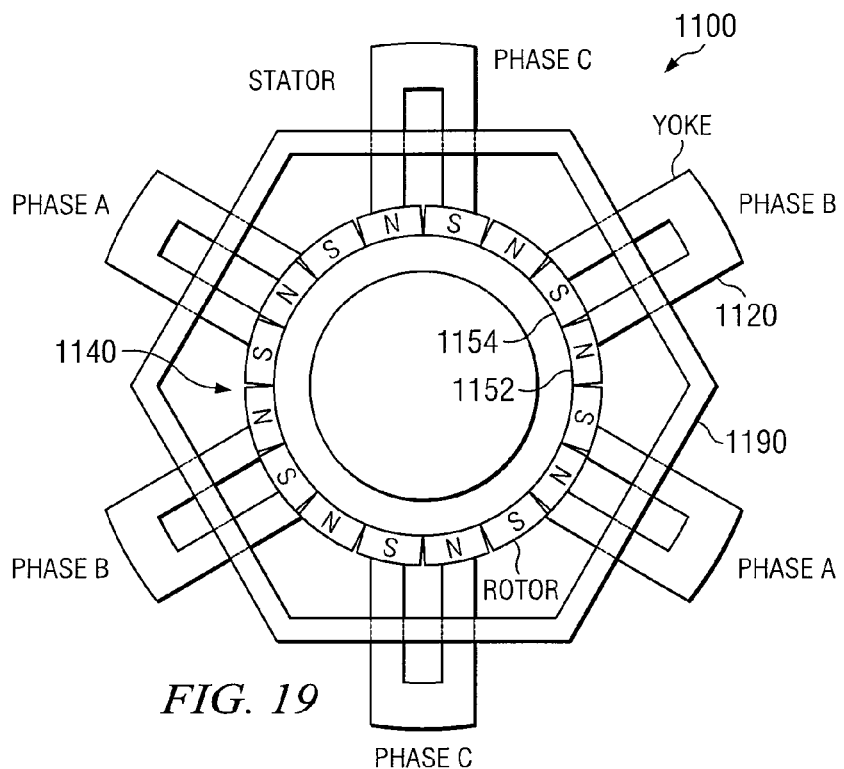
FIG. 19 shows a rotor configuration, according to another embodiment of the invention.

FIG. 19 shows a rotor configuration 1100, according to another embodiment of the invention. The rotor/stator configuration 1100 of FIG. 14 may operate in a similar manner to rotor/stator configuration 1100 of FIG. 14, including U-shaped stator poles 1120, a non-ferromagnetic yoke 1190, and phases A, B, and C, except that a rotor 1140 contains alternating permanent magnet poles 1152, 1154.

Figures 20A, 20B:
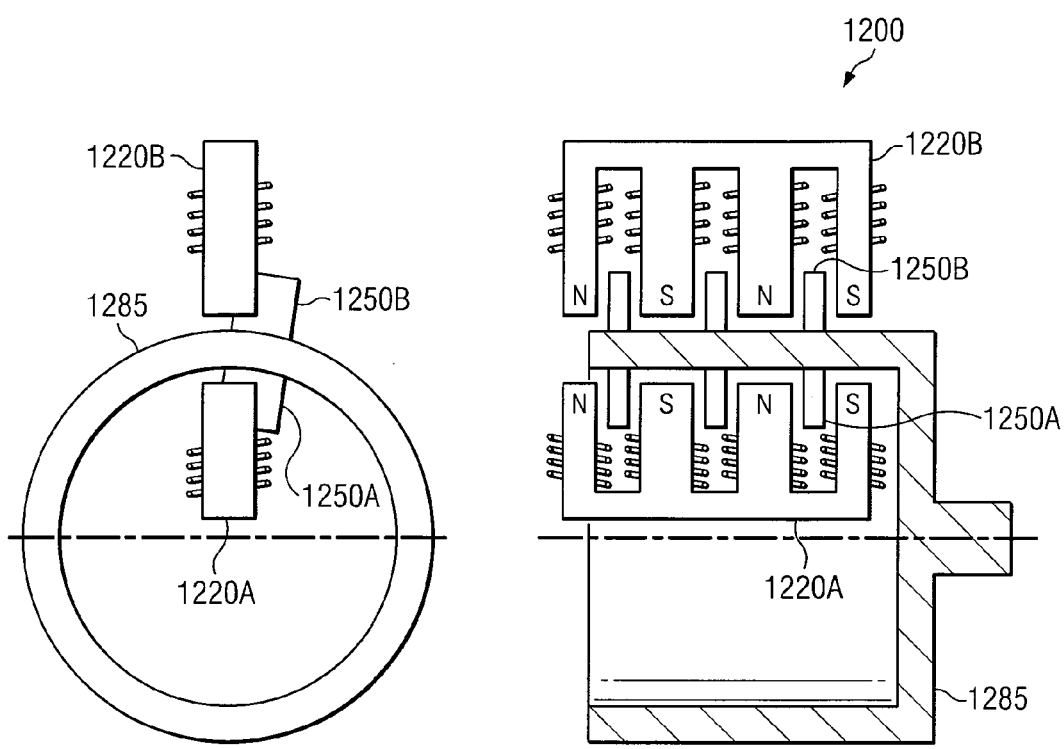
FIG. 20 shows a rotor/stator configuration, according to another embodiment of the invention.

FIG. 20 shows a rotor/stator configuration 1200, according to another embodiment of the invention. In a similar manner to that described above with other embodiments, the rotor/stator configuration 1200 of FIG. 20 may be utilized with various types of electric machines, including motors and generators. The rotor/stator configuration 1200 of FIG. 20 integrates several concepts described with reference to other embodiments, including blades 1250A, 1250B from FIGS. 5A and 5B; E-shaped stator poles 1220A, 1220B from FIG. 13B; stator poles 1220B radially inward of rotor poles 1250B from FIGS. 6-10; and stator poles 1220A radially outward of rotor poles 1250B from FIG. 18. The stator poles 1220A are rigidly mounted both on the inside and outside of a drum 1285, which allows torque to be applied from both the inside and outside thereby increasing the total torque and power density. In particular embodiments, the rotor poles 1250A, 1250B may be made of a ferromagnetic material, such as iron, which is a component of a switched reluctance motor. In other embodiments, the rotor poles 1250A, 1250B could be permanent magnets with the poles parallel to the axis of rotation, which would be a component of a permanent magnet motor.

Figure 21A:
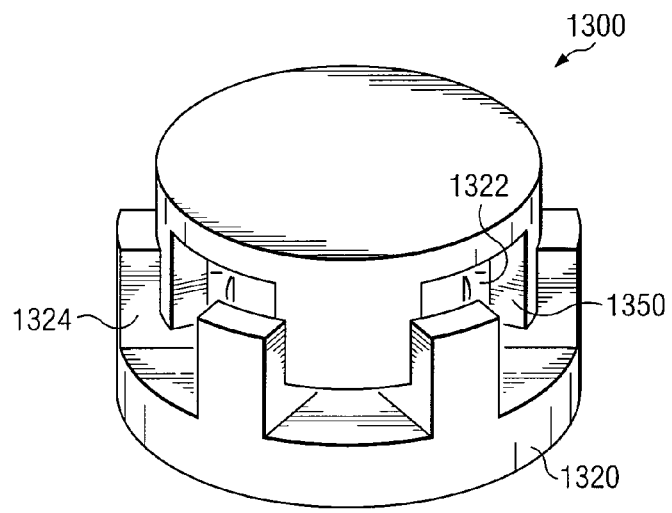
FIGS. 21A and 21B show a rotor/stator configuration, according to another embodiment of the invention.
Figure 21B:
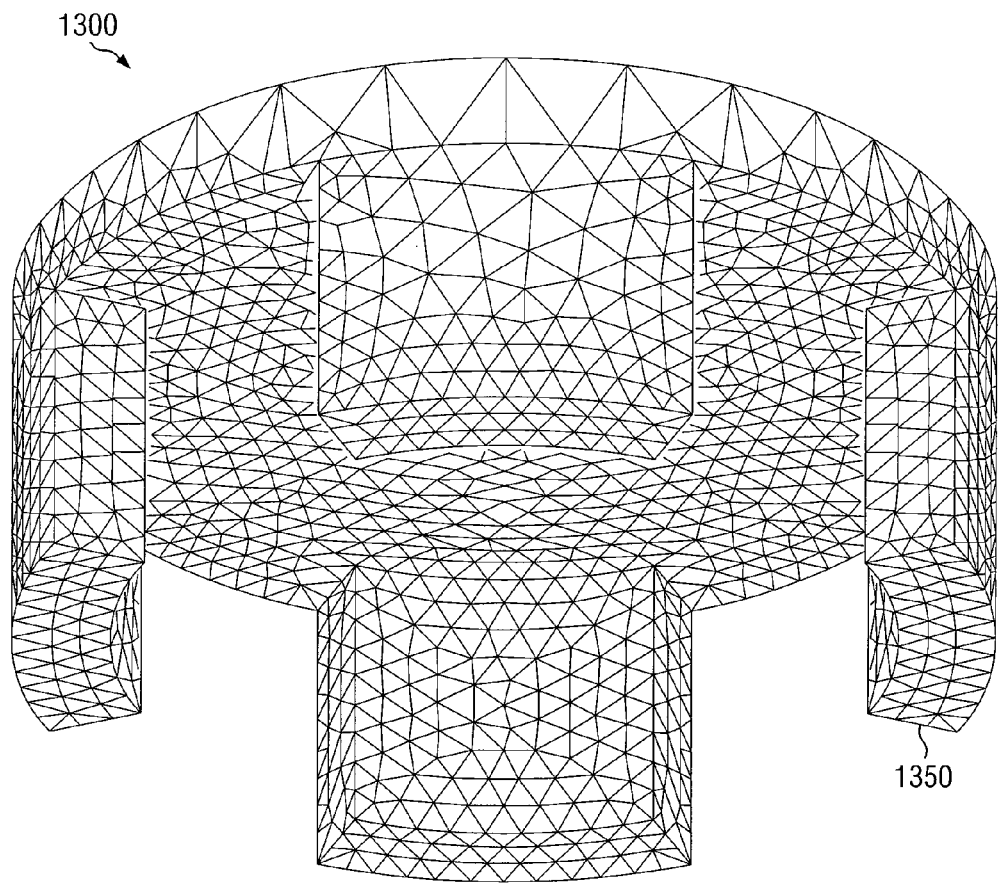

FIGS. 21A and 21B show a rotor/stator configuration 1300, according to another embodiment of the invention. In a similar manner to that described above with other embodiments, the rotor/stator configuration 1200 of FIGS. 21A and 21B may be utilized with various types of electric machines, including motors and generators. The rotor/stator configuration 1300 of FIGS. 21A and 21B may operate in a similar manner to the rotor/stator configuration 1300 of FIGS. 5A and 5B, including rotor poles 1350 and U-shaped stator poles 1320. However, the rotor poles 1350 and U-shaped stator poles 1320 have been rotated ninety degrees such that rotor poles 1350 rotate between a leg 1322 of the stator pole 1320 that is radially inward of the rotor pole 1350 and a leg 1324 of the stator pole 1320 that is radially outward of the rotor pole 1350. In the embodiment of the rotor/stator configuration 1300 of FIGS. 21A and 21B, it can be seen that the axial and radial fluxes co-exist.

In this embodiment and other embodiments, there may be no need for a magnetic back-iron in the stator. Further, in this embodiment and other embodiments, the rotor may not carry any magnetic source. Yet further, in particular embodiments, the back iron of the rotor may not need to be made of ferromagnetic material, thereby creating flexibility design of the interface to the mechanical load.

In this embodiment and other embodiments, configuration may offer higher levels of power density, a better participation of stator and the rotor in force generation process and lower iron losses, thereby offering a good solution for high frequency applications. In various embodiments described herein, the number of stator and rotor poles can be selected to tailor a desired torque versus speed characteristics. In particular embodiments, cooling of the stator may be very easy.

Further, the modular structure of certain embodiments may offer a survivable performance in the event of failure in one or more phases.

Optimization of the Magnetic Forces

FIGS. 22-25 illustrate an optimization of magnetic forces, according to embodiments of the invention. The electromagnetic force on the surface of a rotor has two components, one that is perpendicular to the direction of motion and one that is tangent to the direction of motion. These components of the force may be referred to as normal and tangential components of the force and can be computed from magnetic field quantities according to the following equations:

$$f_n = \frac{1}{2\mu_0}(B_n^2 - B_t^2)$$

$$f_t = \frac{1}{\mu_0} B_n B_t$$

For an optimal operation, the tangential component of the force needs to be optimized while the normal component of the force has to be kept at a minimal level or possibly eliminated. This, however, is not the case in conventional electromechanical converters. To the contrary, the normal force forms the dominant product of the electromechanical energy conversion process. The main reason for this can be explained by the continuity theorem given below. As the flux lines enter from air into a ferromagnetic material with high relative permeability the tangential and normal components of the flux density will vary according to the following equations:

$$B_{n,air} = B_{n,iron}$$

$$B_{t,air} = \frac{1}{\mu_{r,iron}} B_{t,iron}$$

The above equations suggest that the flux lines in the airgap will enter the iron almost perpendicularly and then immediately change direction once enter the iron. This in turn suggests that in a SRM and on the surface of the rotor we only have radial forces.

Figure 22:
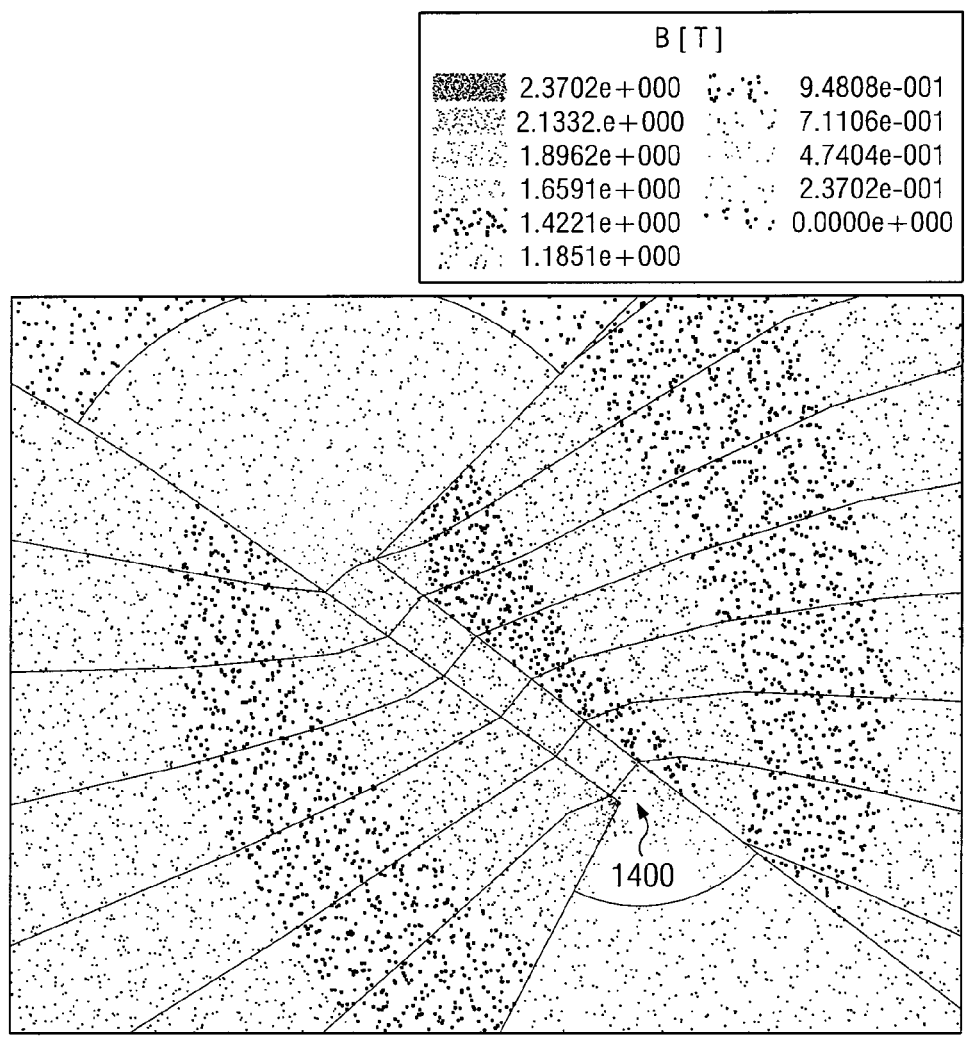
FIG. 22 illustrates the formation of flux lines in a SRM drive.

FIG. 22 illustrates the formation of flux lines in a SRM drive. The flux density, B, is shown in Teslas (T). The radial forces acting on the right side of the rotor (also referred to as fringing flux—indicated by arrow 1400) create radial forces (relative to the rotor surface) that create positive propelling force for the rotor. This is the area that needs attention. The more fluxes are pushed to this corner, the better machine operates. This explains why SRM operates more efficient under saturated condition. This is because due to saturation, the effective airgap of the machine has increased and more flux lines are choosing the fringing path.

Figure 23:
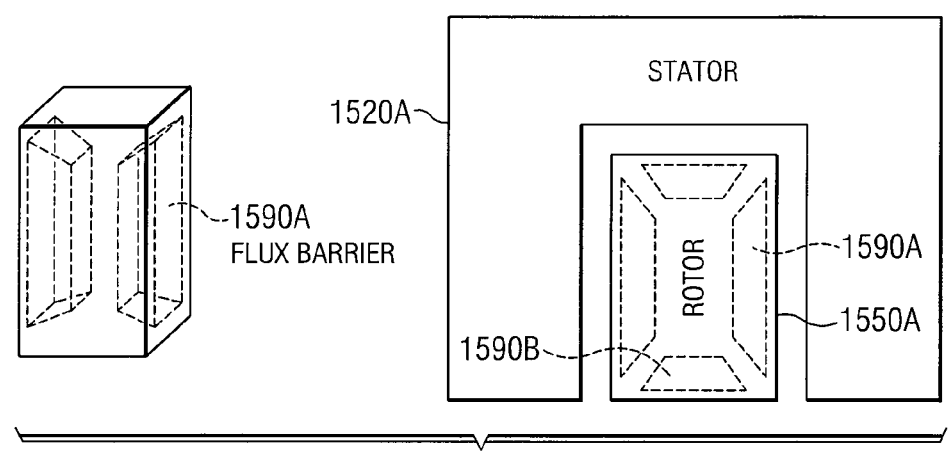
FIGS. 23 and 24 shows the placement of easily saturated materials or flux barriers under the surface of rotors.
Figure 24:
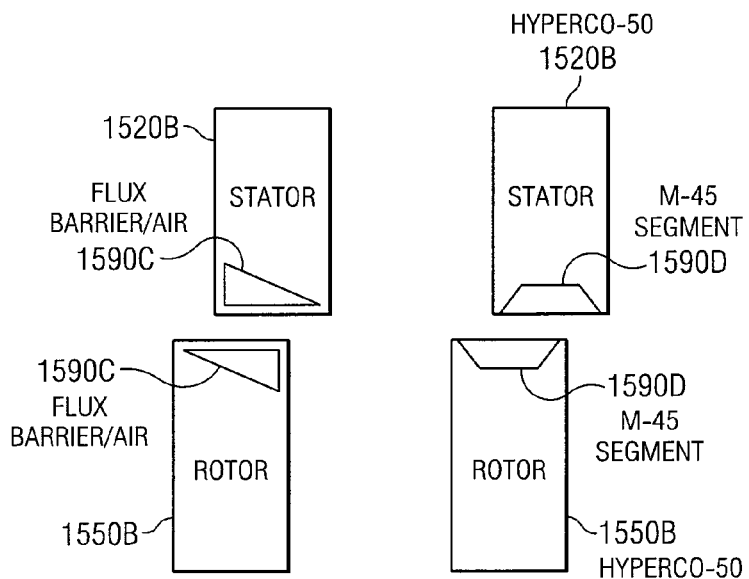
Figure 25:
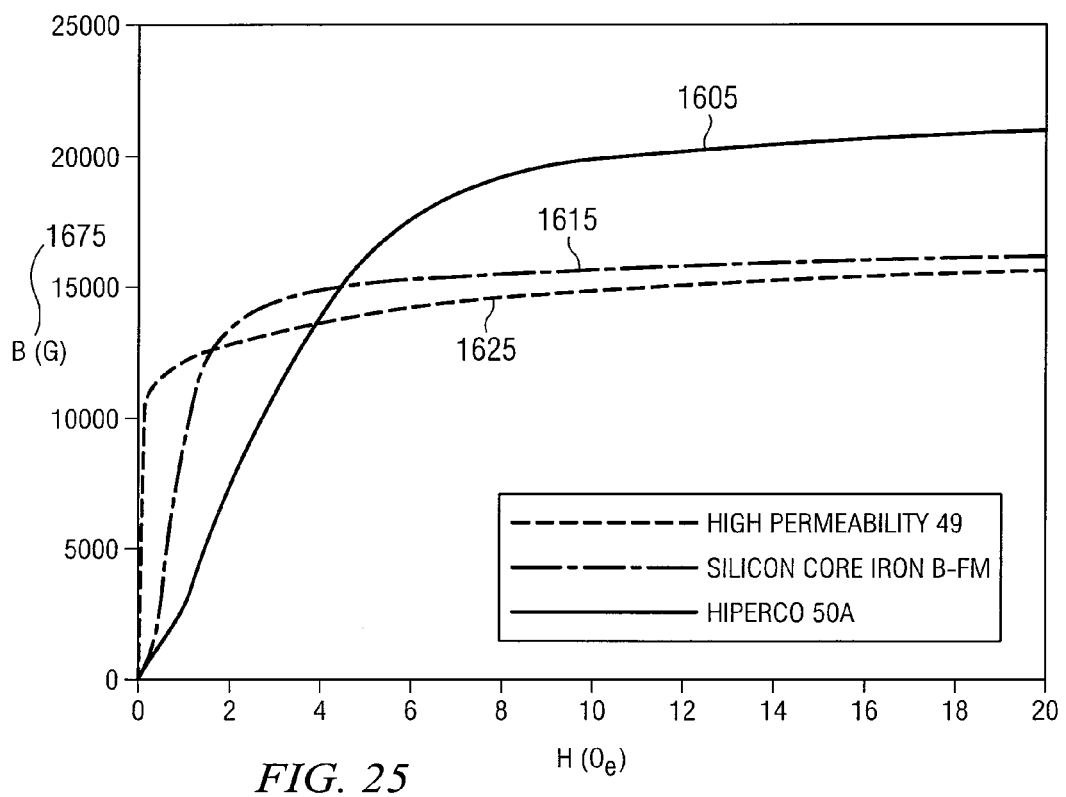
FIG. 25 shows a chart of B-H curves for various alloys.

To enhance the migration of flux lines towards the fringing area, one embodiment of the invention uses a composite rotor surface. In the composite rotor surface, the top most part of the of the rotor is formed by a material that goes to saturation easier and at a lower flux density, thereby reinforcing the fringing at an earlier stage of the electromechanical energy conversion process. In particular embodiments, the shape of the flux barrier or the shape of the composite can be optimized to take full advantage of the magnetic configuration. In another embodiment, flux barriers can be introduced in the rotor to discriminate against radial fluxes entering the rotor normally and push more flux lines towards the fringing area. FIGS. 23, 24 and 25 illustrate these embodiments.

FIGS. 23 and 24 show the placement of easily saturated materials or flux barriers 1590A, 1590B, 1590C, and 1590D under the surface of rotors 1550A, 1550B, and stators 1520A, 1520B. Example materials for easily saturated materials or flux barriers 1590 include, but are not limited to M-45. Example ferromagnetic materials for the rotors 1550 and stators 1520 include, but are not limited HyperCo-50. The shape, configuration, and placement of the easily saturated materials or flux barriers may change based on the particular configurations of the rotors and stators.

FIG. 25 shows a chart 1600 of B-H curve for various alloys. The chart 1600 of FIG. 25 charts magnetic flux density 1675, B, against magnetic field 1685, H, for alloys 1605, 1615, and 1625.

The short-flux-path configurations described with reference to several embodiments herein may be implemented for any SRM application, by changing the number of stator and rotor poles and sizes. Similar configuration may be utilized for axial-field and linear motors.

Several embodiments described herein may additionally be used for permanent magnet AC machines where the rotor contains alternating permanent magnet poles. Both of these families of machines, SRM and BLDC, may be used as both motors and generators.

Additionally, the embodiments described above may be turned inside out and used as an interior stator SRM or BLDC machine, with the rotor on the outside. These in turn can be used both for motoring or generating or both.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An electric machine, comprising:
   a stator having at least one stator pole, the at least one stator pole including a first leg and a second leg;
   a rotor having at least one rotor pole, wherein
       the rotor rotates relative to the stator, and
       the at least one rotor pole is configured to rotate between the first leg and the second leg of the at least one stator pole;
   a first coil disposed on the first leg such that most, if not all, of the first coil disposed on the first leg is spaced apart from a rotational axis of the rotor by a distance greater than or equal to a maximum radius of rotation of the at least one rotor pole; and
   wherein the at least one rotor pole and the at least one stator pole are configured such that a magnetic flux induced on the at least one rotor pole flows in a direction substantially parallel to a rotational axis of the rotor.

2. The electric machine of claim 1, wherein the at least one stator pole is U-shaped.

3. The electric machine of claim 1, wherein the at least one rotor pole is a ferromagnetic blade.

4. The electric machine of claim 1, wherein the electric machine is selected from the group consisting of:
   a switched reluctance motor;
   a motor other than a switched reluctance motor; and
   a generator.

5. The electric machine of claim 1, wherein the at least one rotor pole comprises at least two permanent magnets aligned, with respect to each other, parallel to the rotational axis of the rotor.

6. The electric machine of claim 1, wherein the at least one rotor pole and the at least one stator pole are configured such that a magnetic flux induced on the at least one rotor pole flows from the first leg through the at least one rotor pole to the second leg upon rotation of the at least one rotor pole between the first leg and the second leg.

7. The electric machine of claim 6, wherein the at least one stator pole and the at least one rotor pole are configured such that the magnetic flux does not traverse an interior of the rotor.

8. The electric machine of claim 7, wherein an interior of the rotor is a compressor.

9. The electric machine of claim 7, wherein an interior of the rotor is an expander.

10. The electric machine of claim 6, further comprising:
    at least one coil disposed on the at least one stator pole, the at least one coil operable to induce the magnetic flux.

11. The electric machine of claim 10, further comprising:
    a casing separating an interior portion of the electrical machine from an exterior portion of the electrical machine, wherein the at least one coil is disposed on an exterior of the casing.

12. The electric machine of claim 6, further comprising:
    a second coil disposed on second leg, the first and second coils operable to induce the magnetic flux.

13. The electric machine of claim 1, wherein
    the stator has a plurality of stator poles, each of the plurality of stator poles including a first leg and a second leg,
    the rotor has a plurality of rotor poles, and
    each of the plurality of rotor poles rotate between each of the first legs and the second legs of the plurality of stator poles.

14. The electric machine of claim 13, wherein
    wherein the plurality of stator poles and the plurality of rotor poles are configured such that a magnetic flux induced on each of the plurality of stator poles does not traverse an interior of the rotor.

15. The electric machine of claim 14, wherein an interior of the rotor is a compressor.

16. The electric machine of claim 14, wherein an interior of the rotor is an expander.

17. The electric machine of claim 13, further comprising:
    at least one coil disposed on each of the plurality of stator poles, the at least one coil operable to selectively induce a magnetic flux.

18. The electric machine of claim 17, further comprising:
    a casing separating an interior portion of the electrical machine from an exterior portion of the electrical machine, wherein the at least one coil on each of the plurality of stator poles is disposed on an exterior of the casing.

19. The electric machine of claim 18, wherein
    each of the plurality of stator poles is disposed in a cartridge removably coupleable to the casing.

20. The electric machine of claim 13, wherein each of the plurality of stator poles is electrically and magnetically isolated from the rest of the plurality of stator poles.

21. The electric machine of claim 20, wherein each of the plurality of rotor poles is a ferromagnetic blade.

22. The electric machine of claim 1, wherein
    the at least one stator pole is more than four stator poles,
    the at least one rotor pole is more than four rotor poles, and
    the more than four stator poles and the more than four rotor poles are configured such that two sets of the more than four stator poles may be electrically fired at the same time to attract two sets of the more than four rotor poles.

23. An electric machine, comprising:
a stator having more than four stator poles, each stator pole comprising a coil; and
a rotor having more than four rotor poles, wherein
the rotor rotates relative to the stator such that each of the rotor poles traverses a radius of rotation disposed radially inward from most, if not all, of each coil of each of the stator poles; and
the more than four stator poles and the more than four rotor poles are configured such that two sets of the more than four stator poles may be electrically fired at the same time to attract two sets of the more than four rotor pole; and
wherein the more than four rotor poles and the more than four stator poles are configured such that a magnetic flux induced on at least one of the more than four rotor poles flows in a direction substantially parallel to a rotational axis of the rotor.

24. The electric machine of claim 23, wherein
each set of the two sets of the more than four stator poles are one hundred and eighty degrees part.

25. The electric machine of claim 23, wherein
the more than four stator poles is more than six stator poles, the more than four rotor poles is more than six rotor poles, and
the more than six stator poles and the more than six rotor poles are configured such that three sets of the more than six stator poles may be fired at the same time to attract three sets of the more than six rotor poles.

26. The electric machine of claim 23, wherein the more than four stator poles are U-shaped.

27. The electric machine of claim 23, wherein the more than four rotor poles are ferromagnetic blades.

28. The electric machine of claim 23, wherein the electric machine is a motor.

29. The electric machine of claim 28, wherein the electric machine is a switched reluctance motor.

30. The electric machine of claim 23, wherein
each of the more than four stator poles include a first leg and a second leg,
each of the more than four rotor poles rotate between each of the first legs and the second legs of the more than four stator poles.

31. The electric machine of claim 23, wherein
the more than four stator poles and the more than four rotor poles are configured such that a magnetic flux induced on each of the more than four stator pole does not traverse an interior of the rotor.

32. The electric machine of claim 31, wherein an interior of the rotor is a compressor.

33. The electric machine of claim 31, wherein an interior of the rotor is an expander.

34. The electric machine of claim 23, wherein each coil is operable to selectively induce a magnetic flux.

35. The electric machine of claim 34, further comprising:
a casing separating an interior portion of the electrical machine from an exterior portion of the electrical machine, wherein the at least one coil on each of the more than four stator poles is disposed on an exterior of the casing.

36. The electric machine of claim 35, wherein
each of the more than four stator poles is disposed in a cartridge removably coupleable to the casing.

37. The electric machine of claim 23, wherein each of the more than four stator pole is electrically and magnetically isolated from the rest of the more than four stator pole.

38. The electric machine of claim 23, wherein the more than four rotor poles each comprise at least two permanent magnets aligned, with respect to each other, parallel to the rotational axis of the rotor.

39. An electric machine, comprising:
a stator having at least one stator pole;
a rotor having at least one rotor pole, wherein
the rotor rotates relative to the stator; and
the rotor pole comprises at least three flux barriers, each flux barrier spaced apart from each other flux barrier, the at least three flux barriers configured to:
discriminate against radial fluxes entering the rotor normally; and
push more flux lines toward a fringing area of the rotor.

40. The electric machine of claim 39, further comprising a coil disposed on the at least one stator pole such that most, if not all, of the coil disposed on the at least one stator pole is spaced apart from a rotational axis of the rotor by a distance greater than or equal to a maximum radius of rotation of the at least one rotor pole; and
wherein the at least one rotor pole and the at least one stator pole are configured such that a magnetic flux induced on the at least one rotor pole flows in a direction substantially parallel to a rotational axis of the rotor.

41. The electric machine of claim 39, wherein at least a portion of the at least one rotor pole is a ferromagnetic blade.

42. The electric machine of claim 39, wherein the electric machine is selected from the group consisting of:
a switched reluctance motor;
a motor other than a switched reluctance motor; and
a generator.

43. The electric machine of claim 39, wherein at least one of the at least three flux barriers is an air channel.

44. The electric machine of claim 39, wherein at least one of the at least three flux barriers is an M-45 segment.

45. The electric machine of claim 39, wherein the at least one stator pole, the at least a first rotor pole and the at least a second rotor pole are configured such that a magnetic flux does not traverse an interior of the rotor.

46. The electric machine of claim 45, wherein an interior of the rotor is a compressor.

47. The electric machine of claim 45, wherein an interior of the rotor is an expander.

48. The electric machine of claim 45, further comprising:
at least one coil disposed on the at least one stator pole, the at least one coil operable to induce the magnetic flux.

49. The electric machine of claim 48, further comprising:
a casing separating an interior portion of the electrical machine from an exterior portion of the electrical machine, wherein the at least one coil is disposed on an exterior of the casing.

* * * * *